(12) United States Patent
Inui et al.

(10) Patent No.: US 8,801,015 B2
(45) Date of Patent: Aug. 12, 2014

(54) VEHICLE

(75) Inventors: Akira Inui, Shizuoka (JP); Takashi Yamamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/600,267

(22) Filed: Aug. 31, 2012

(65) Prior Publication Data

US 2014/0062052 A1    Mar. 6, 2014

(51) Int. Cl.
*B60G 11/26* (2006.01)
*B60G 17/08* (2006.01)
*B60G 17/04* (2006.01)

(52) U.S. Cl.
USPC ............ 280/124.157; 280/124.16; 280/5.508; 280/5.515

(58) Field of Classification Search
USPC ........... 280/124.157, 124.16, 124.161, 5.506, 280/5.508, 5.512, 5.515, 124.106, 124.107, 280/124.134, 124.1, 35, 124.137, 124.158, 280/124.159; 180/89.17, 311
See application file for complete search history.

(56) References Cited

U.S. PATENT DOCUMENTS

| | | | | |
|---|---|---|---|---|
| 4,607,861 A | * | 8/1986 | Eisenberg et al. | 267/64.11 |
| 4,671,521 A | * | 6/1987 | Talbot et al. | 280/16 |
| 5,269,556 A | * | 12/1993 | Heyring | 280/5.508 |
| 5,556,115 A | * | 9/1996 | Heyring | 280/6.158 |
| 5,562,305 A | * | 10/1996 | Heyring | 280/5.507 |
| 5,785,344 A | | 7/1998 | Vandewal et al. | |
| 5,865,280 A | | 2/1999 | Kurachi et al. | |
| 5,915,701 A | * | 6/1999 | Heyring | 280/6.155 |
| 5,975,624 A | * | 11/1999 | Rasidescu et al. | 296/203.01 |
| 6,428,024 B1 | * | 8/2002 | Heyring et al. | 280/124.106 |
| 6,622,806 B1 | * | 9/2003 | Matsuura | 180/68.1 |
| 7,472,914 B2 | * | 1/2009 | Anderson et al. | 280/5.519 |
| 7,510,199 B2 | | 3/2009 | Nash et al. | |
| 8,226,090 B2 | * | 7/2012 | Hammelmaier et al. | 280/5.52 |
| 8,286,978 B2 | * | 10/2012 | Marabese | 280/124.112 |

(Continued)

FOREIGN PATENT DOCUMENTS

JP    09-95119 A    4/1997
JP    09-202122 A    8/1997

(Continued)

OTHER PUBLICATIONS

Edmunds, Dan. 2012 McLaren MP4-12C: Susupension Walkaround [online], [retrieved on Sep. 18, 2013]. Retrieved from the Internet <URL: http://www.edmunds.com/car-reviews/track-tests/2012-mclaren-mp4-12c-suspension-walkaround.html>.*

*Primary Examiner* — Paul N Dickson
*Assistant Examiner* — Barry Gooden, Jr.
(74) *Attorney, Agent, or Firm* — Keating & Bennett, LLP

(57) ABSTRACT

A vehicle includes a pair of front wheels; a pair of rear wheels; a cabin frame portion; a first support frame portion extending forward from the cabin frame portion; a second support frame portion extending rearward from the cabin frame portion; a first suspension system supported by the first support frame portion and suspending the front wheels; and a second suspension system supported by the second support frame portion and suspending the rear wheels. Each of the first suspension system and the second suspension system includes a damping unit. Each damping unit includes a pair of dampers generating damping forces via oil viscosity resistance; an adjuster that adjusts the damping forces generated by the dampers; and a pair of oil paths which connect the dampers with the adjuster.

10 Claims, 18 Drawing Sheets

(56) References Cited

U.S. PATENT DOCUMENTS

| | | |
|---|---|---|
| 8,434,774 B2* | 5/2013 | Leclerc et al. .......... 280/124.157 |
| 8,517,135 B2* | 8/2013 | Schapf et al. ................. 180/233 |
| 2006/0185951 A1 | 8/2006 | Tanaka |
| 2008/0023249 A1 | 1/2008 | Sunsdahl et al. |
| 2008/0053738 A1 | 3/2008 | Kosuge et al. |
| 2009/0174158 A1* | 7/2009 | Anderson et al. .......... 280/5.507 |
| 2012/0242057 A1* | 9/2012 | Glover et al. .......... 280/124.158 |

FOREIGN PATENT DOCUMENTS

| | | |
|---|---|---|
| JP | 2006-103378 A | 4/2006 |
| JP | 2008-062736 A | 3/2008 |
| JP | 4213269 B2 | 1/2009 |
| WO | 2005/038289 A1 | 4/2005 |

\* cited by examiner

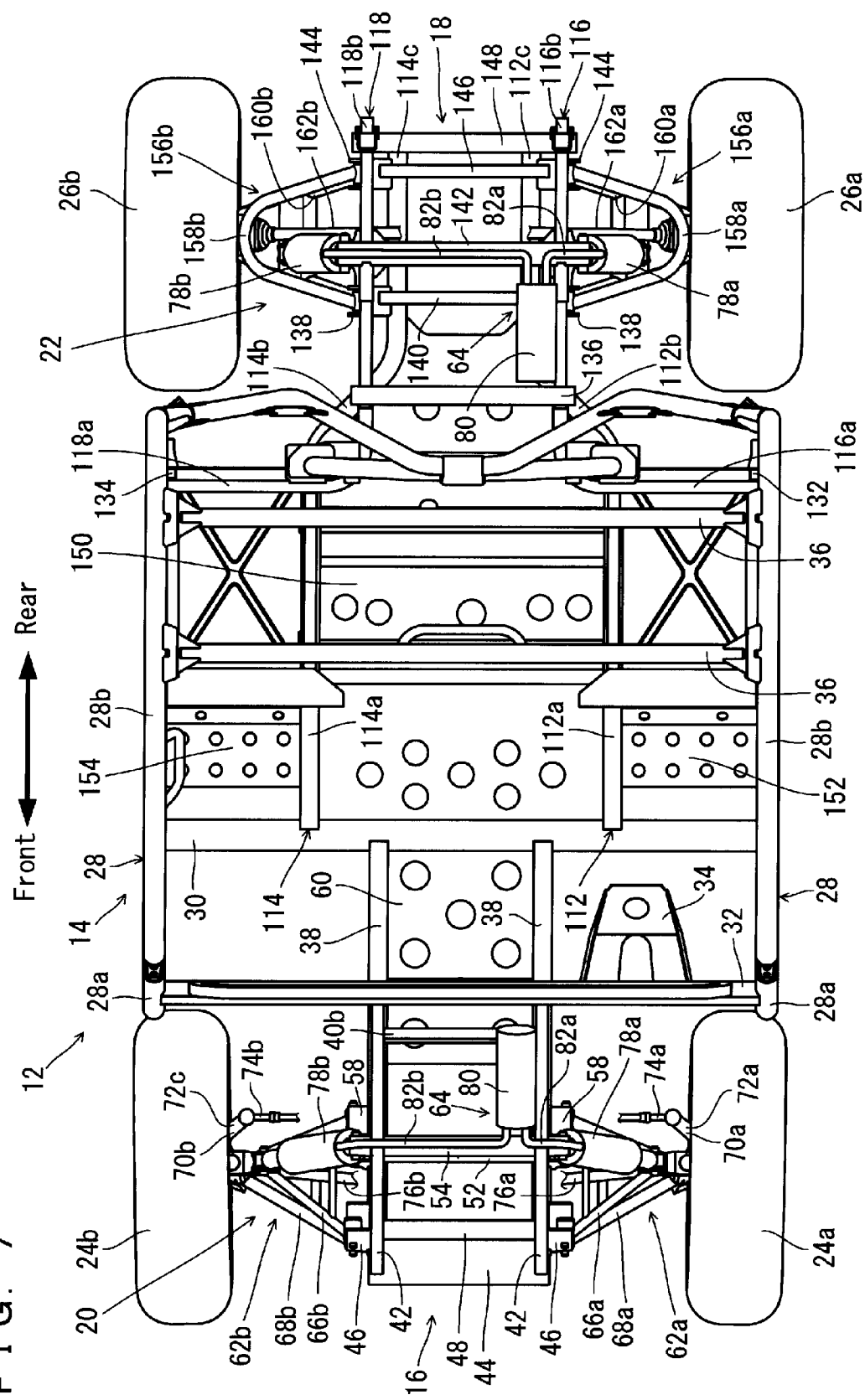
F I G. 7

F I G. 1 3
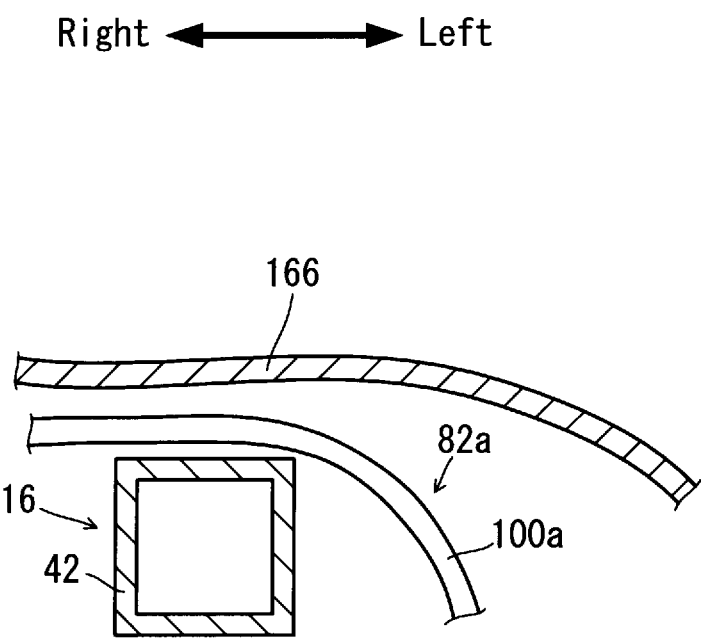

VEHICLE

BACKGROUND OF THE INVENTION

1. Field of the Invention

The present invention relates to vehicles, and more specifically, to a vehicle which includes a suspension system.

2. Description of the Related Art

Conventionally, there is proposed a suspension system (see JP 4213269, for example) for use in automobiles. The system includes a pair of dampers which generate damping forces from a viscosity resistance of oil; an adjuster which adjusts the damping forces generated by the dampers; and a pair of hoses which connect the adjuster with the pair of dampers while allowing the oil to pass through. With such a configuration, the suspension system can increase damping forces generated by the dampers when the two dampers are receiving forces from opposite directions, respectively. This allows appropriate absorption of rolling forces working on a body of a moving automobile, for example, by the pair of dampers, making it possible to improve riding comfort in the automobile.

An automobile equipped with such a suspension system as described above typically has a monocoque body. The adjuster of the suspension system is disposed inside the monocoque body (e.g., in an engine compartment or a trunk) while the pair of dampers are disposed outside the monocoque body. The hoses which connect the dampers and the adjuster with each other are routed to pass through the monocoque body.

In consideration of the rigidity of monocoque body, it is not desirable to make holes in the monocoque body that are large enough to allow the dampers and the adjuster to pass through. For this reason, in conventional automobiles equipped with suspension systems as described above, it is preferable that the holes made in the monocoque body are as small as possible to allow the hoses to pass through. However, in this case, it is not possible to install the suspension system if it is already assembled (i.e., if the dampers and the adjuster are already connected to each other with the hoses), to the monocoque body. As a solution, when installing a suspension system to an automobile which has a monocoque body, first, the adjuster and the dampers are installed separately at predetermined locations in the monocoque body, with the hoses already connected to the dampers for example. Thereafter, the hoses are routed through the holes in the monocoque body, and then the hoses are connected to the adjuster. This completes the connection between the dampers and the adjuster via the hoses.

In the cases where the dampers and the adjuster are separated from each other when installing to the monocoque body, oil inside the dampers and the adjuster must be prevented from leaking. In the suspension system disclosed in JP 4213269, the hoses connected to the dampers have tip portions each provided with a plug having a valve member, while the adjuster is provided with sockets each having a valve member, so that the plugs and the sockets are connected with each other to connect the hoses and the adjuster with each other. According to this arrangement, the valves in the plugs prevent oil inside the dampers from leaking outside via the hoses even if the hoses and the adjuster are not connected with each other. Also, the valves in the sockets prevent oil inside the adjuster from leaking to outside.

In conventional automobiles having monocoque bodies, the dampers and the adjuster must be installed as separated from each other as described above. This complicates the manufacture, and in turn increases the cost of manufacturing the automobile. Also, since the valve members must be provided in the suspension system for oil leak prevention, product cost of the suspension system is increased, which then increases product cost of the automobile.

SUMMARY OF THE INVENTION

Therefore, preferred embodiments of the present invention provide a more economical vehicle which is easier to manufacture, including a damping unit that includes an adjuster arranged to adjust damping forces.

According to a preferred embodiment of the present invention, a vehicle includes at least a pair of wheels; a suspension system suspending the pair of wheels; a cabin frame portion; and a support frame portion extending to a more forward or rearward position than the cabin frame portion and supporting the suspension system. The suspension system includes a damping unit. The damping unit includes a pair of dampers provided at a distance from each other in the vehicle width direction correspondingly to the wheels for generation of damping forces via oil viscosity resistance; an adjuster that adjusts the damping forces generated by the pair of dampers; and a pair of oil paths connecting the dampers and the adjuster with each other and allowing the oil to flow through. The support frame portion includes a pair of upper frame members provided at a distance from each other in the vehicle width direction and extending in a fore-aft direction; and a pair of lower frame members provided at a lower height than the pair of upper frame members at a distance from each other in the vehicle width direction and extending in the fore-aft direction. A space is provided between the pair of upper frame members and the pair of lower frame members that allows the dampers to pass. Each damper includes a first connecting portion connected with the oil path; the adjuster includes a pair of second connecting portions connected with the pair of oil paths; none of the first connecting portions, the second connecting portions and the oil paths are provided with valves capable of stopping oil flow; and at least a portion of the damper on one side in the vehicle width direction is disposed on a more outer side than the upper frame member on the one side in the vehicle width direction.

According to a preferred embodiment of the present invention, the vehicle includes a cabin frame portion and a support frame portion instead of a monocoque body. With this, the suspension system which includes the damping unit is supported by the support frame portion. In this case, unlike a case where the suspension system is installed to a monocoque body, it is possible to install a preassembled damping unit (specifically, the damping unit in which the pair of dampers and the adjuster are already connected with each other by the pair of oil paths) to the support frame portion. This makes it easier to manufacture the vehicle. The support frame portion allows the dampers to pass through a space between the upper frame members and the lower frame members. Thus, when installing the damping unit to the support frame portion, it is possible to pass the dampers through the space between the upper frame members and the lower frame members. The arrangement makes it possible to increase the number of variations in layout of the damping unit. Specifically, for example, the damping unit may be arranged such that the pair of oil paths and the adjuster are routed to pass through the space between the pair of upper frame members and the pair of lower frame members to connect the pair of dampers with each other. It is also possible not to pass the dampers through the space between the upper frame members and the lower frame members when installing the damping unit to the support frame portion. In such a case, the damping unit may be disposed so that the pair of oil paths and the adjuster are routed to pass above the pair of upper frame members (or below the pair of lower frame members) to connect the pair of dampers with each other. Since the number of layout variations increases in disposing the damping unit, it is possible to change the layout of the damping unit appropriately in accordance with the structure (especially of the support frame portion) of the vehicle, manufacturing environment of the vehicle, etc. By doing so, it becomes possible to increase operation efficiency when installing the damping unit to the support frame portion. As a result, it is possible to provide a more economical vehicle. Also, since the pair of dampers and the adjuster can be connected with each other in advance with the oil paths, there is no need for providing valves at connecting portions between the dampers and the oil paths; at connecting portions between the adjuster and the oil paths; or in the oil paths, in order to prevent oil leakage. Therefore, in a preferred embodiment of the present invention, no valves capable of stopping oil flow are provided at the first connecting portion in each damper; the second connecting portions in the adjuster; or in the oil paths. This provides a more economical damping unit, which makes it possible to provide a more economical vehicle. Also, at times of performing maintenance activities, for example, the damping unit can be removed from the support frame portion without disconnecting the dampers and the adjuster from the oil paths. The arrangement makes it easier to remove the damping unit, leading to easier maintenance of the vehicle.

Preferably, one of the oil paths is routed to pass above the upper frame member on the one side and connected with the damper on the one side. In this case, it is possible to dispose the one of the oil paths and the damper on the one side to stride over the upper frame member on the one side. This makes it easier to attach and detach the damping unit to and from the support frame portion. This makes manufacture and maintenance of the vehicle easier.

More preferably, the vehicle further includes an external member covering the support frame portion, and the one of the oil paths is routed to pass between the upper frame member on the one side and the external member. In this case, it is possible to protect the one of the oil paths with the external member.

Further preferably, the external member is openable and closable with respect to the support frame portion. In this case, servicing the damping unit becomes easier by opening the external member.

Further preferably, the external member is supported by the support frame portion detachably therefrom and attachably thereto. In this case, servicing the damping unit becomes easier by removing the external member.

Preferably, the oil paths and the adjuster are routed to pass above the upper frame members to connect the dampers with each other. In this case, it is possible to dispose the damping unit to stride over the upper frame members. This makes it easier to attach/detach the damping unit to/from the support frame portion.

More preferably, the pair of wheels are provided by a pair of front wheels; the support frame portion extends to a more forward position than the cabin frame portion; and the oil paths and the adjuster are routed to pass through a more forward region than the cabin frame portion to connect the dampers with each other. In this case, the arrangement makes it possible to increase a cabin space since the oil paths and the adjuster are not disposed inside the cabin frame portion.

Further preferably, the pair of wheels are provided by a pair of rear wheels; the support frame portion extends to a more rearward position than the cabin frame portion; and the oil paths and the adjuster are routed to pass through a more rearward region than the cabin frame portion to connect the dampers with each other. In this case, the arrangement makes it possible to increase a cabin space since the oil paths and the adjuster are not disposed inside the cabin frame portion.

Preferably, the upper frame members pivotably support the dampers.

Preferably, the suspension system includes a pair of arm units pivotably supporting the wheels with respect to the support frame portion, and the lower frame members pivotably support the arm units.

Preferably, the upper frame members and the lower frame members are provided by pipe members. In this case, the arrangement makes it possible to reduce the weight of the support frame portion.

According to another preferred embodiment of the present invention, a vehicle includes at least a pair of wheels; a suspension system suspending the pair of wheels; a cabin frame portion; and a support frame portion extending to a more forward or rearward position than the cabin frame portion and supporting the suspension system. The suspension system includes a damping unit. The damping unit includes a pair of dampers provided at a distance from each other in the vehicle width direction correspondingly to the wheels for generation of damping forces via oil viscosity resistance; an adjuster that adjusts the damping forces generated by the pair of dampers; and a pair of oil paths connecting the dampers and the adjuster with each other and allowing the oil to flow through. The support frame portion includes a pair of upper frame members provided at a distance from each other in the vehicle width direction and extending in a fore-aft direction; and a pair of lower frame members provided at a lower height than the pair of upper frame members at a distance from each other in the vehicle width direction and extending in the fore-aft direction. At least a portion of the damper on one side in the vehicle width direction is disposed on a more outer side than the upper frame member on the one side in the vehicle width direction, and at least a portion of the damper on another side in the vehicle width direction is disposed on a more outer side than the upper frame member on the another side in the vehicle width direction. Each damper includes a first connecting portion connected with the oil path; the adjuster includes a pair of second connecting portions connected with the pair of oil paths; none of the first connecting portions, the second connecting portions and the oil paths are provided with valves capable of stopping oil flow; and one of the oil paths is routed to pass below the upper frame member on the one side and connected to the damper on the one side.

According to a preferred embodiment of the present invention, the vehicle includes a cabin frame portion and a support frame portion instead of a monocoque body. With this, the suspension system which includes the damping unit is supported by the support frame portion. In this case, unlike a case where the suspension system is installed to a monocoque body, it is possible to install a preassembled damping unit to the support frame portion. This makes it easier to manufacture the vehicle, making it possible to provide a more economical vehicle. Also, the pair of dampers and the adjuster can be connected with each other in advance with the oil paths. Therefore, there is no need to provide valves at connecting portions between the dampers and the oil paths; at connecting portions between the adjuster and the oil paths; or in the oil paths, in order to prevent oil leakage. Therefore, in the present invention, no valves capable of stopping oil flow are provided at the first connecting portion in each damper; the second connecting portions in the adjuster; or in the oil paths. This provides a more economical damping unit, which makes it possible to provide a more economical vehicle. Also, at times of maintenance activities for example, the damping unit can be removed from the support frame portion without disconnecting the dampers and the adjuster from the oil paths. The arrangement makes it easier to remove the damping unit, leading to easier maintenance of the vehicle. In a preferred embodiment of the present invention, at least one of the oil paths is routed below the upper frame member on one side to connect to the damper on the one side. The arrangement makes it possible to protect the one of the oil paths by the upper frame member on the one side.

Preferably, at least a portion of the damper on the one side is disposed on a more outer side than the lower frame member on the one side in the vehicle width direction, and the one of the oil paths is routed to pass between the upper frame member on the one side and the lower frame member on the one side. In this case, the arrangement makes it possible to protect the one of the oil paths by the upper frame member on the one side and the lower frame member on the one side.

More preferably, at least a portion of the damper on the another side is disposed on a more outer side than the upper frame member on the another side and the lower frame member on the another side in the vehicle width direction, and the oil paths and the adjuster are routed to pass through a space between the upper frame members and the lower frame members to connect the dampers with each other. In this case, the arrangement makes it possible to protect the adjuster and the pair of oil paths by the pair of upper frame members and the pair of lower frame members.

Further preferably, the pair of wheels are provided by a pair of front wheels, the support frame portion extends to a more forward position than the cabin frame portion, and the oil paths and the adjuster are routed to pass through a more forward region than the cabin frame portion to connect the dampers with each other. In this case, the arrangement makes it possible to increase a cabin space since the oil paths and the adjuster are not disposed inside the cabin frame portion.

Further preferably, the pair of wheels are provided by a pair of rear wheels, the support frame portion extends to a more rearward position than the cabin frame portion, and the oil paths and the adjuster are routed to pass through a more rearward region than the cabin frame portion to connect the dampers with each other. In this case, the arrangement makes it possible to increase a cabin space since the oil paths and the adjuster are not disposed inside the cabin frame portion.

Preferably, the support frame portion allows the dampers to pass between the upper frame member on the one side and the lower frame member on the one side, as well as between the pair of upper frame members. In this case, it is possible to install the damping unit to the support frame portion from one side of the support frame portion or from above the support frame portion. Specifically, when the damping unit is installed to the support frame portion from one side of the support frame portion, first, a preassembled damping unit is disposed on the one side of the support frame portion. Thereafter, the damper which is to be disposed on another side of the support frame portion is passed between the upper frame member on the one side and the lower frame member on the one side; then between the pair of upper frame members; then above the upper frame member on the another side; and then to the another side of the support frame portion, for example. In this way, it is possible to install the damping unit to the support frame portion from the one side of the support frame portion. On the other hand, when the damping unit is installed to the support frame portion from above the support frame portion, first, a preassembled damping unit is disposed above the support frame portion. Thereafter, the damper which is to be disposed on the one side of the support frame portion is passed between the pair of upper frame members; then between the upper frame member on the one side and the lower frame member on the one side; and then to the one side of the support frame portion, for example. The damper which is to be disposed on another side of the support frame portion may be passed above the upper frame member on the another side; and then to the another side of the support frame portion, for example. In this way, it is possible to install the damping unit to the support frame portion from above the support frame portion. As has been described, according to the vehicle with the above-described structure, it is possible to install the damping unit to the support frame portion from one side of the support frame portion or from above the support frame portion. In this case, it is possible to select an appropriate installation procedure of the damping unit in accordance with the structure of the vehicle, manufacturing environment of the vehicle, etc. Therefore, it becomes easier to install the damping unit to the support frame portion.

More preferably, the support frame portion allows the adjuster to pass between the upper frame member on the one side and the lower frame member on the one side, as well as between the pair of upper frame members. In this case, it is possible to pass the adjuster from one side of the support frame portion, and then between the upper frame member on the one side and the lower frame member on the one side, to dispose the adjuster inside the support frame portion; or to pass the adjuster from above the support frame portion, and then between the pair of upper frame members, to dispose the adjuster inside the support frame portion. Specifically, it is possible to dispose the adjuster inside the support frame portion regardless of the installation procedure of the damping unit.

Further preferably, the support frame portion allows the damper on the another side to pass between the upper frame member on the another side and the lower frame member on the another side. In this case, it is also possible to pass the damper which is to be disposed on the another side between the upper frame member on the another side and the lower frame member on the another side, and then to the another side of the support frame portion when installing the damping unit to the support frame portion. The arrangement makes it possible to increase the number of variations in layout and the number of variations in installation procedure of the damping unit, thereby making it easier to install the damper to the support frame portion.

Preferably, the upper frame members pivotably support the dampers.

Preferably, the suspension system includes a pair of arm units pivotably supporting the wheels with respect to the support frame portion, and the lower frame members pivotably support the arm units.

Preferably, the upper frame members and the lower frame members are provided by pipe members. In this case, the arrangement makes it possible to reduce the weight of the support frame portion.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a plan view, showing the frame supported by the front wheels and the rear wheels.

FIG. 13 is a front sectional view, showing a relationship between an upper frame member, an oil path and a front lid.

DETAILED DESCRIPTION OF THE PREFERRED EMBODIMENTS

Hereinafter, preferred embodiments of the present invention will be described with reference to the drawings. It is noted that the terms front and rear, right and left, up and down as used in the preferred embodiments of the present invention are determined from the driver's position on a seat 176 of a vehicle 10, with the driver facing toward a steering wheel 184.

Figure 1:
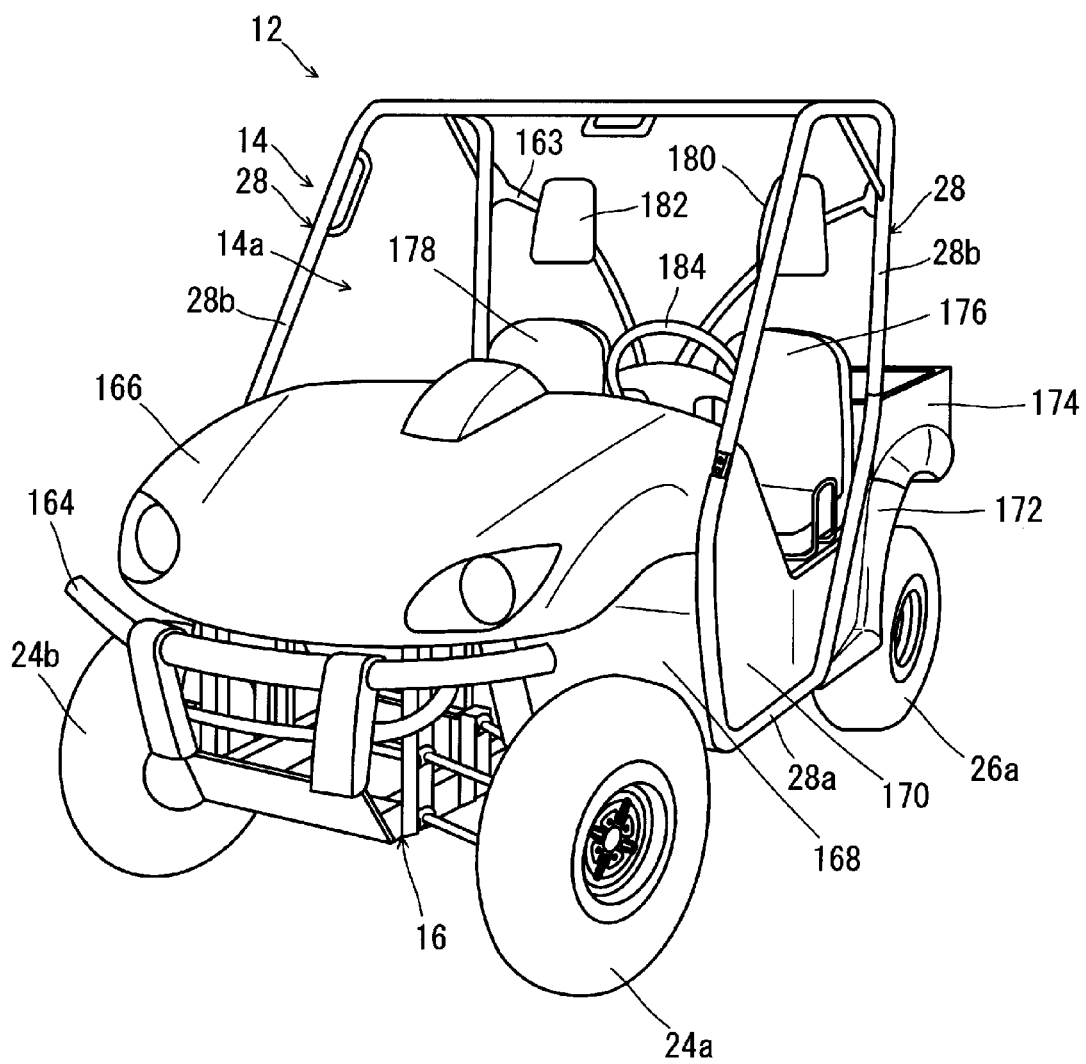
FIG. 1 is a perspective view of a vehicle according to a preferred embodiment of the present invention.

Referring to FIG. 1, the vehicle 10 includes a frame 12. Referring to FIG. 2 through FIG. 5, the frame 12 includes a cabin frame portion 14 (see FIG. 2 and FIG. 3) which provides a cabin 14*a* (see FIG. 1); a first support frame portion 16 (see FIG. 2 and FIG. 4) which is connected to the cabin frame portion 14 and extending to a more forward position than the cabin frame portion 14; and a second support frame portion 18 (see FIG. 2 and FIG. 5) which is connected to the cabin frame portion 14 and extending to a more rearward position than the cabin frame portion 14.

Figure 2:
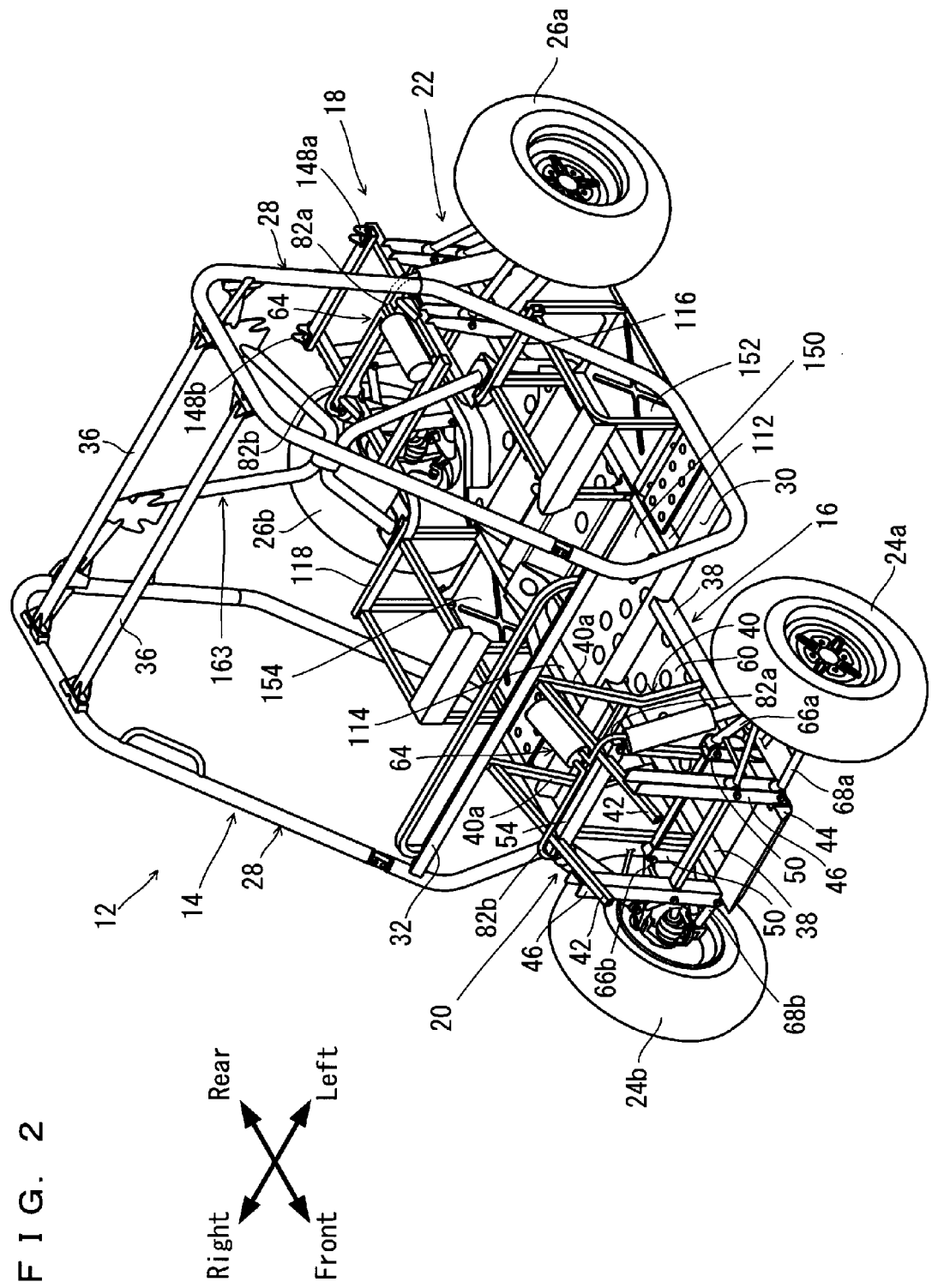
FIG. 2 is a perspective view, showing a frame supported by front wheels and rear wheels.
Figure 6:
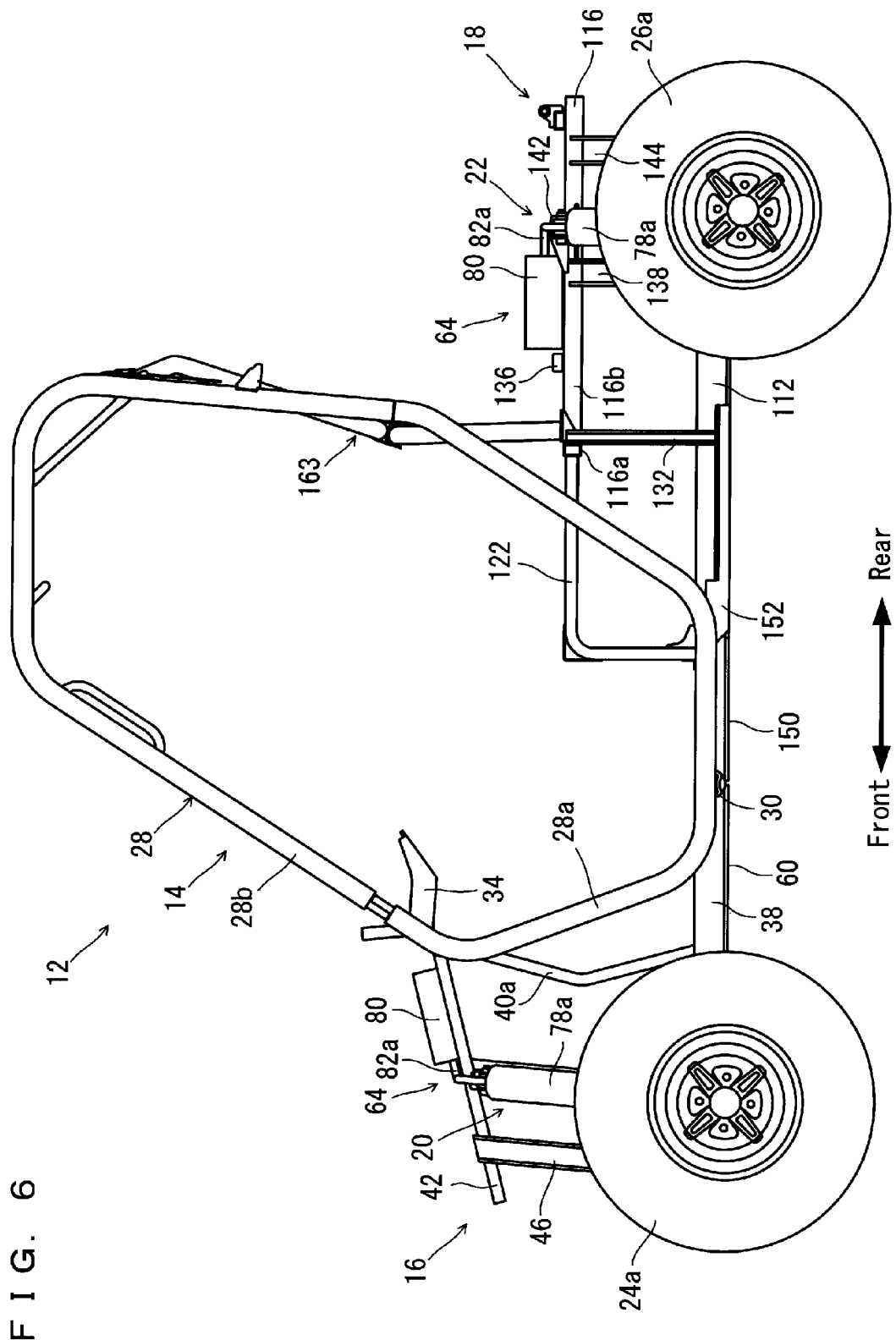
FIG. 6 is a side view, showing the frame supported by the front wheels and the rear wheels.

Referring to FIG. 2, FIG. 6 and FIG. 7, the first support frame portion 16 supports a first suspension system 20. The second support frame portion 18 supports a second suspension system 22. The first suspension system 20 suspends a pair of front wheels 24*a*, 24*b* whereas the second suspension system 22 suspends a pair of rear wheels 26*a*, 26*b*. The first suspension system 20 and the second suspension system 22 will be described later in detail.

Figure 3:
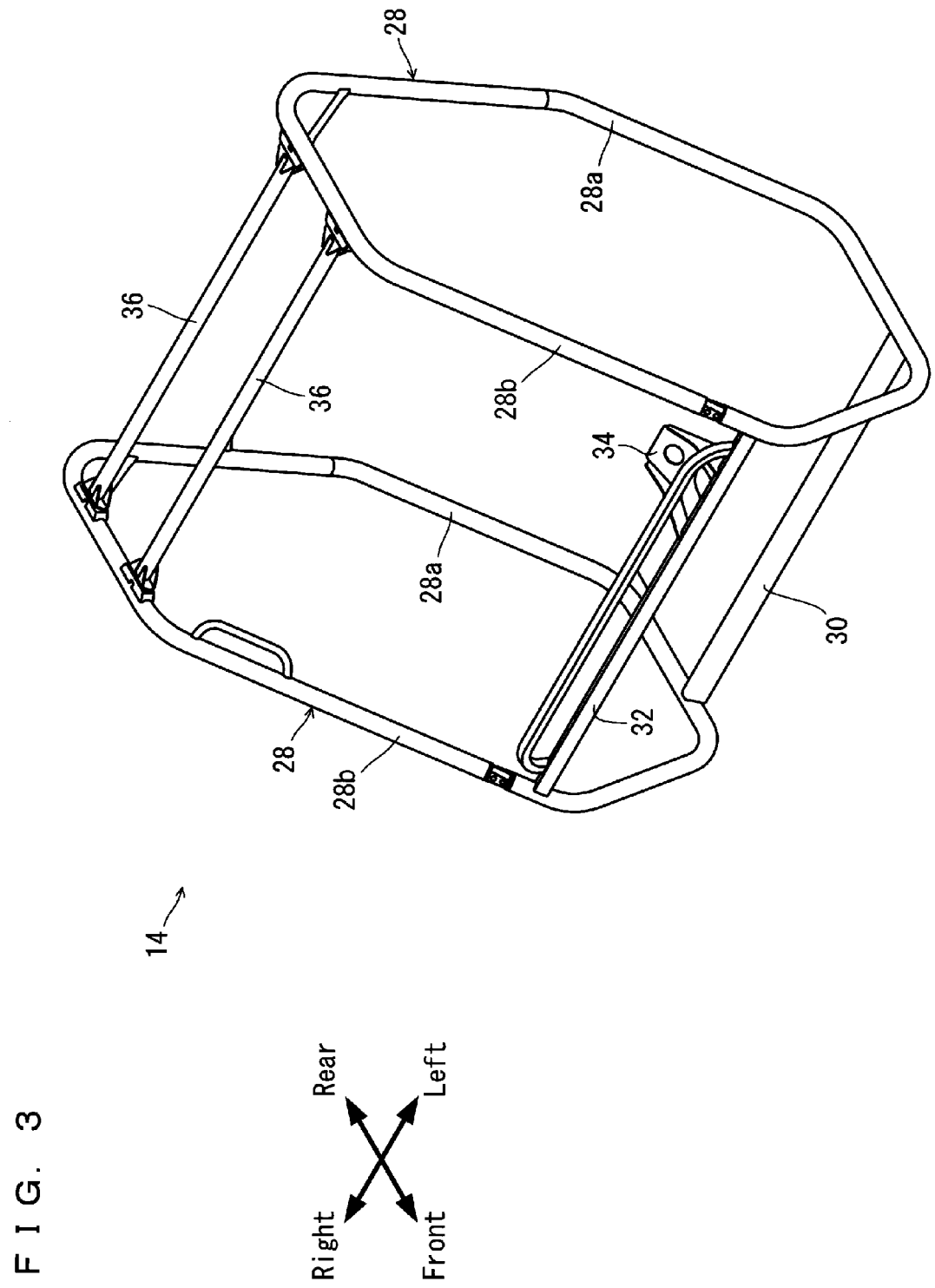
FIG. 3 is a perspective view, showing a cabin frame portion.

Referring to FIG. 2, FIG. 3 and FIG. 6, the cabin frame portion 14 includes a pair of annular side-frame members 28 disposed at a distance from each other in the left-right direction (in the width direction of the vehicle 10). Referring to FIG. 3 and FIG. 6, each side frame member 28 includes a base frame member 28*a* which preferably has a substantially U-shaped profile in a side view; and a protection frame member 28*b* which is connected to the base frame member 28*a* and has a substantially inverted shape of U in a side view. The base frame member 28*a* and the protection frame member 28*b* may be defined by circular pipe members, for example.

Referring to FIG. 3, the cabin frame portion 14 includes a lower end portion provided with a cross member 30 defined by a circular pipe, which connects the pair of base frame members 28*a* with each other. The cabin frame portion 14 includes a front end portion provided with a cross member 32 defined by a rectangular pipe, which connects the base frame members 28*a* with each other. At a location on a left half of the cross member 32, a shaft support portion 34 extends rearward from the cross member 32. The shaft support portion 34 supports a steering shaft (not illustrated), to which a steering wheel 184 (see FIG. 1) to be described later is attached. In an upper end region of the cabin frame portion 14, a plurality (two, according to the present preferred embodiment) of cross members 36 provided by circular pipes connect the pair of protection frame members 28*b* with each other.

Figure 4:
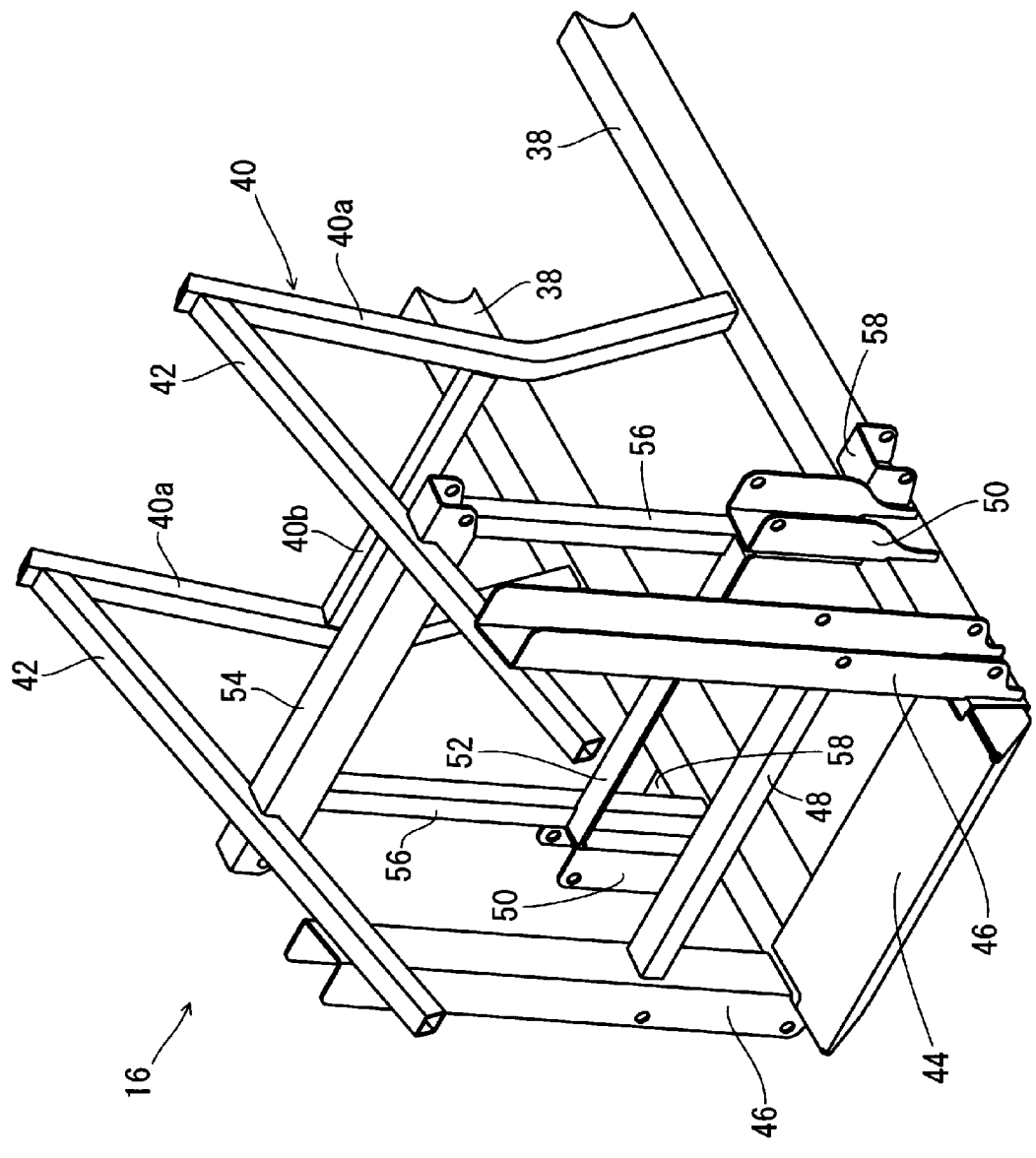
FIG. 4 is a perspective view, showing a first support frame portion.

Referring to FIG. 2 and FIG. 4, the first support frame portion 16 includes lower frame members 38 which are a pair of rectangular pipes disposed on the left and right sides and extending forward from the cross member 30 (see FIG. 2); a connecting member 40 which is H-shaped in a front view and connects the lower frame members 38 with the cross member 32; and upper frame members 42 which are a pair of rectangular pipes extending forward and obliquely downward from an upper end portion of the connecting member 40 above the lower frame members 38.

Referring to FIG. 4, the connecting member 40 includes main members 40*a* which are a pair of rectangular pipes extending in the up-down direction and connecting the cross member 32 (see FIG. 2) with the lower frame members 38; and a cross member 40*b* which is a rectangular pipe extending in the left-right direction and connecting the pair of main members 40*a*. The upper frame members 42 have their rear end portions connected to upper end portions of the main members 40*a*. Referring to FIG. 6, the main members 40*a* are bent at their substantially intermediate region, to point forward.

Figure 8:
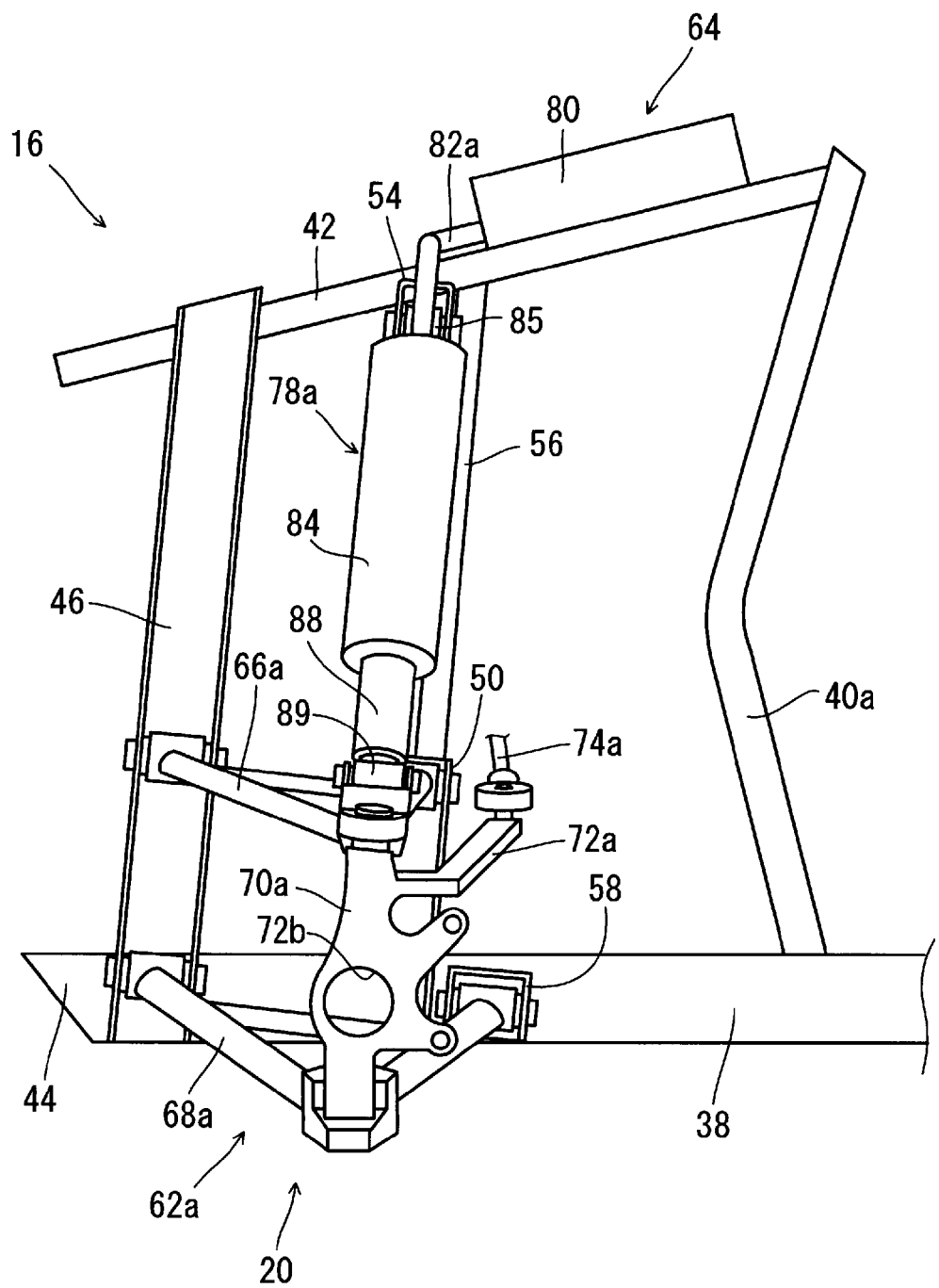
FIG. 8 is a side view, showing the first support frame portion and a first suspension system.

Referring to FIG. 4, the pair of lower frame members 38 are connected with each other at their front end portions by a cross member 44. The lower frame members 38 have their front end portions connected with corresponding front end portions of the upper frame members 42 by a pair of support members 46 each having a substantially U-shaped section. Referring to FIG. 8, the support members 46 extend in a lower-to-upper direction, slightly tilting toward rear. Referring to FIG. 4, the support members 46 are connected with each other at a height above the cross member 44, by a cross member 48 which is provided by a rectangular pipe.

Referring to FIG. 4 and FIG. 8, a pair of support members 50 extend from the lower frame members 38 in an obliquely upward and rearward direction, at more rearward locations than the support members 46. Each of the support members 50 preferably has a substantially U-shaped section like the support member 46. Referring to FIG. 4, the pair of support members 50 have their upper end portions connected with each other by a platy cross member 52.

Referring to FIG. 4 and FIG. 8, the upper frame members 42 are connected with each other above the cross member 52 (see FIG. 4) by a support member 54 which is a member including an inverted U-shaped section. Referring to FIG. 4, the support member 54 has its two end portions positioned at more outside locations than the upper frame members 42 in the width direction of the vehicle 10.

Referring to FIG. 4 and FIG. 8, on an inner side of the pair of support members 50, a pair of connecting members 56 each provided by a rectangular pipe are erected behind the cross member 52 (see FIG. 4) and the support member 54, to connect the lower frame members 38 with the upper frame members 42. The connecting members 56 extend in a lower-to-upper direction with a slight tilt toward rear.

Referring to FIG. 4 and FIG. 8, a pair of support members 58 are provided on respective side surfaces of lower frame members 38 at more rearward locations than the support members 50. Specifically, with reference to FIG. 4, one of the support members 58 is on a left side surface of the left-side lower frame member 38 while the other of the support members 58 is on a right side surface of the right-side lower frame member 38.

Referring to FIG. 2, FIG. 6 and FIG. 7, a generally rectangular protection plate 60 extends forward from the cross member 30 of the cabin frame portion 14. The protection plate 60 includes a rear end portion connected to a lower end portion of the cross member 30. The protection plate 60 has its left and right end portions connected to lower surfaces of the lower frame members 38.

Figure 9:
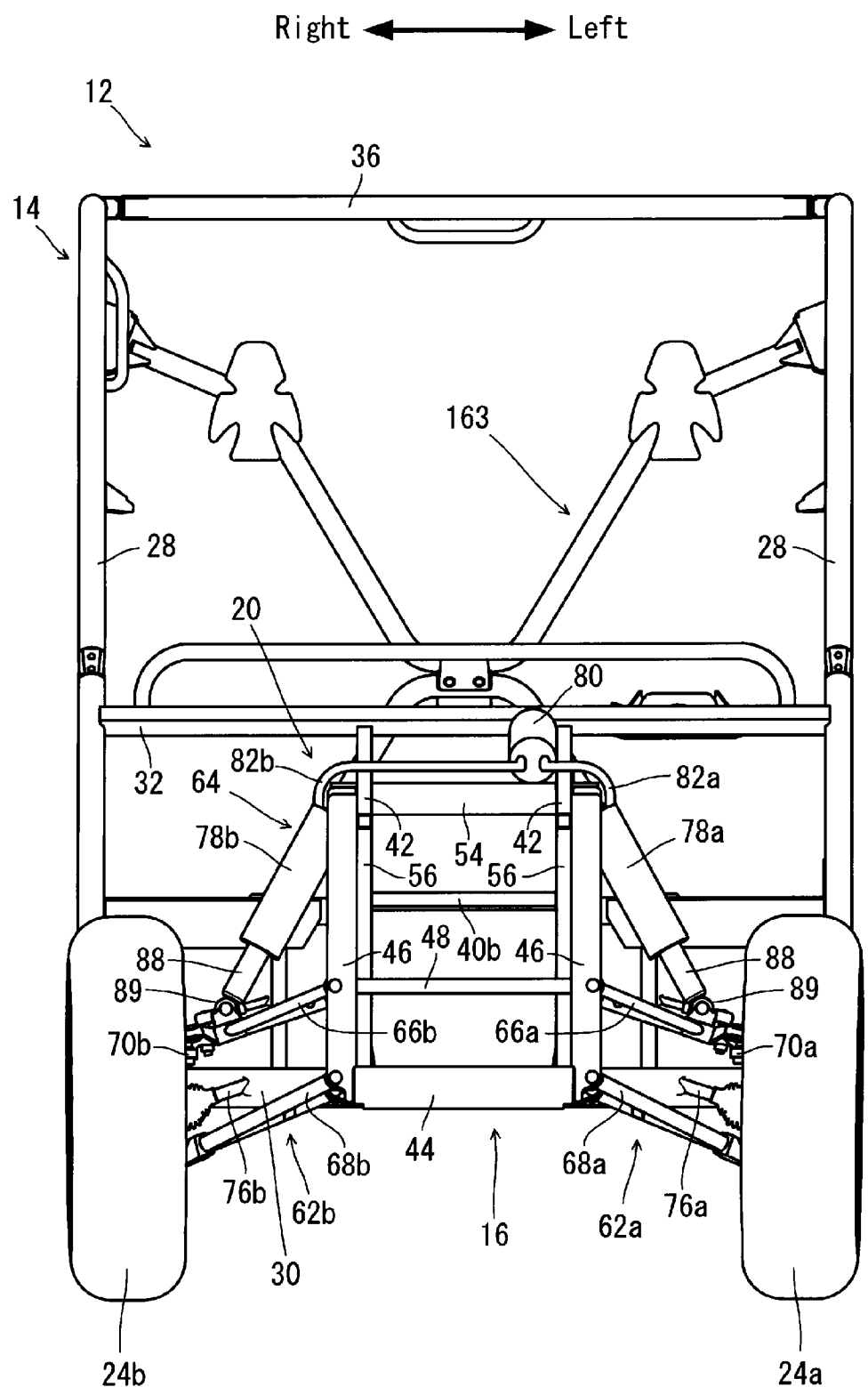
FIG. 9 is a front view, showing the frame supported by the front wheels and the rear wheels.

Referring to FIG. 7 through FIG. 9, the first suspension system 20 includes arm units 62a, 62b and a damping unit 64. It should be noted here that the second suspension system 22 also includes a damping unit 64 as will be described later. The arm unit 62a includes an upper arm 66a, a lower arm 68a, and an upright 70a which connects the upper arm 66a and the lower arm 68a with each other.

Referring to FIG. 2 and FIG. 8, the arm unit 62a is pivotably supported by the left-side lower frame member 38 via the support member 46, the support member 50 and the support member 58 (see FIG. 8). Specifically, the upper arm 66a has its front end portion supported by the support member 46 pivotably in the up-down direction whereas the upper arm 66a has its rear end portion supported by the support member 50 pivotably in the up-down direction. The lower arm 68a has its front end portion supported by the support member 46 pivotably in the up-down direction whereas the lower arm 68a has its rear end portion supported by the support member 58 (see FIG. 8) pivotably in the up-down direction. Thus, the upper arm 66a and the lower arm 68a are pivotable in the up-down direction with respect to the first support frame portion 16.

Referring to FIG. 8, the upright 70a has its upper end portion supported by a left end portion of the upper arm 66a pivotably in the up-down and the left-right directions whereas the upright 70a has its lower end portion supported by a left end portion of the lower arm 68a pivotably in the up-down and the left-right directions. Thus, the upright 70a is pivotable in the up-down and left-right directions with respect to the upper arm 66a and the lower arm 68a. The front wheel 24a (see FIG. 7) is rotatably supported by the upright 70a.

Referring to FIG. 7 and FIG. 9, the arm unit 62b has essentially the same construction as the arm unit 62a, and including an upper arm 66b, a lower arm 68b and an upright 70b. The arm unit 62b is pivotably supported by the right-side lower frame member 38 via the support member 46, the support member 50 (see FIG. 2) and the support member 58 (see FIG. 7). Specifically, the upper arm 66b has its front end portion supported by the support member 46 pivotably in the up-down direction whereas the upper arm 66b has its rear end portion supported by the support member 50 (see FIG. 2) pivotably in the up-down direction. The lower arm 68b has its front end portion supported by the support member 46 pivotably in the up-down direction whereas the lower arm 68b has its rear end portion supported by the support member 58 (see FIG. 7) pivotably in the up-down direction. Thus, the upper arm 66b and the lower arm 68b are pivotable in the up-down direction with respect to the first support frame portion 16. The front wheel 24b is rotatably supported by the upright 70b.

Referring to FIG. 7 and FIG. 8, a link portion 72a is provided on an upper portion of the upright 70a of the arm unit 62a to extend obliquely in a rearward direction toward the first support frame portion 16. Referring to FIG. 8, a through-hole 72b is provided at a substantially center region of the upright 70a. Referring to FIG. 7, like in the upright 70a, a link portion 72c is provided on an upper portion of the upright 70b to extend obliquely in a rearward direction toward the first support frame portion 16, and a through-hole (not illustrated) is provided at a substantially center region of the upright 70b.

A tie-rod 74a is connected to the link portion 72a of the upright 70a whereas a tie-rod 74b is connected to the link portion 72c of the upright 70b. The tie-rods 74a, 74b are coupled to the steering wheel 184 (see FIG. 1) via an unillustrated coupling mechanism. Steering operation by the driver is transmitted to the front wheels 24a, 24b via the tie-rods 74a, 74b and the uprights 70a, 70b, to pivot the front wheels 24a, 24b in the left-right direction.

Referring to FIG. 7 and FIG. 9, a front wheel shaft 76a is inserted rotatably through the through-hole 72b (see FIG. 8) in the upright 70a, whereas a front wheel shaft 76b is inserted rotatably through the through-hole (not illustrated) in the upright 70b. The front wheel shaft 76a includes an end portion coupled with the front wheel 24a whereas the front wheel shaft 76a includes another end portion coupled with a front wheel differential (not illustrated). The front wheel shaft 76b includes an end portion coupled with the front wheel 24b whereas the front wheel shaft 76b includes another end portion coupled with the front wheel differential (not illustrated). An engine (not illustrated) to be described later generates power, which is transmitted to the front wheels 24a, 24b via a front wheel power transmission shaft (not illustrated), the front wheel differential (not illustrated) and the front wheel shafts 76a, 76b. Thus, the front wheels 24a, 24b are rotated.

Figure 10:
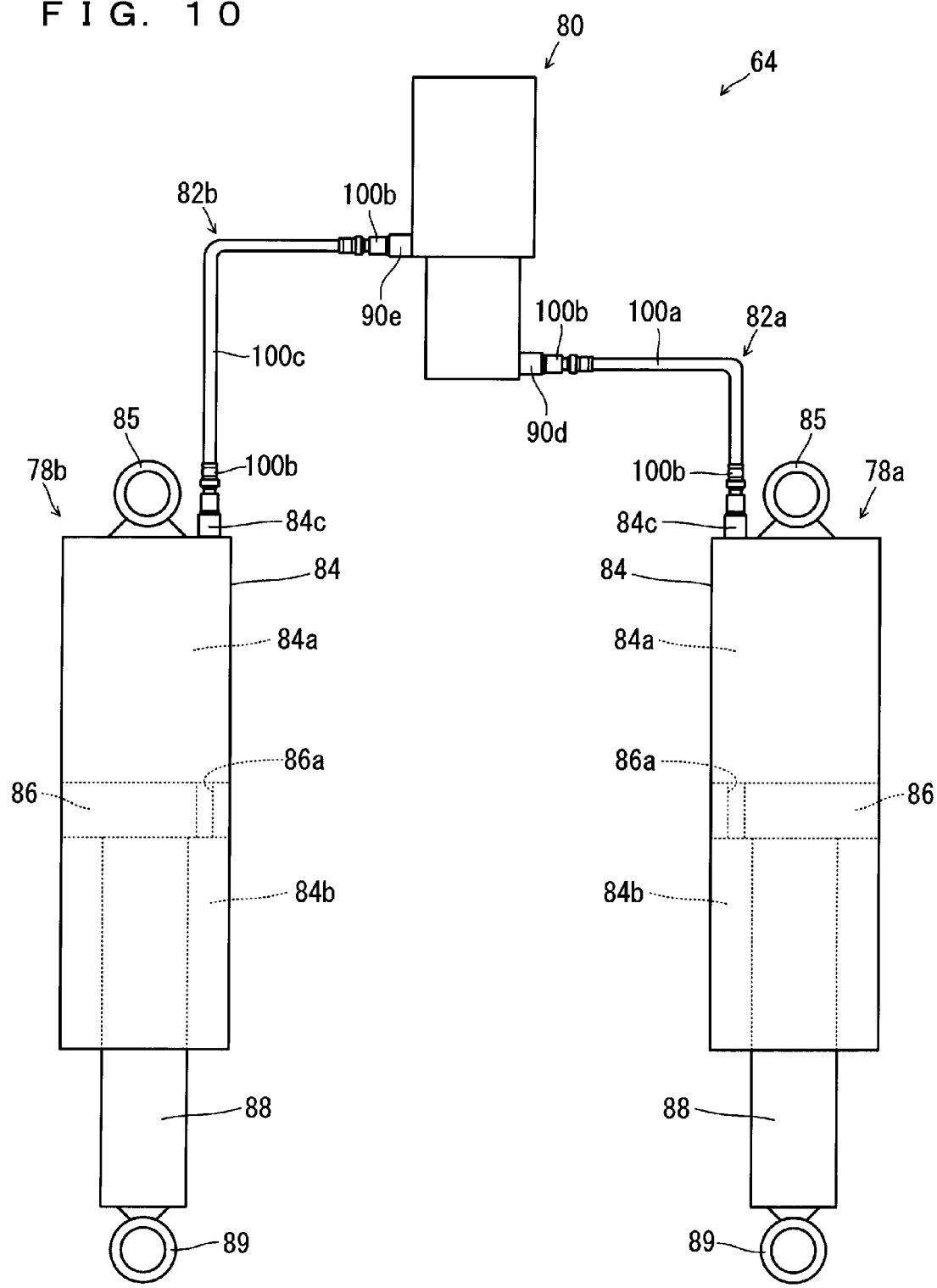
FIG. 10 is a schematic diagram, showing a configuration of a damping unit.

Referring to FIG. 10, the damping unit 64 includes a pair of dampers 78a, 78b which generate damping forces due to viscosity resistance of oil; an adjuster 80 that adjusts the damping forces generated by the dampers 78a, 78b; and a pair of oil paths 82a, 82b which connect the dampers 78a, 78b with the adjuster 80. Referring to FIG. 9, in the present preferred embodiment, the dampers 78a, 78b are disposed at a distance from each other in the width direction of the vehicle 10 correspondingly to their respective front wheels 24a, 24b. It should be noted here that FIG. 2 and FIG. 6 through FIG. 9 show constituent elements of the damping unit 64 in a simplified fashion in order to avoid complication in the drawings.

Referring to FIG. 10, in the present preferred embodiment, the dampers 78a, 78b are identical with each other. Each of the dampers 78a, 78b includes a cylinder 84 loaded with oil; an annular mounting member 85 provided at an upper end portion of the cylinder 84; a piston 86 provided slidably inside the cylinder 84 and dividing an interior of the cylinder 84 into a first oil chamber 84a and a second oil chamber 84b; piston rod 88 fixed to the piston 86; and an annular mounting member 89 provided at a lower end portion of the piston rod 88.

The cylinder 84 includes a connecting portion 84c that connects the oil path 82a (or the oil path 82b) to the cylinder 84. Although the connecting portion 84c is provided at an upper end portion (a ceiling portion) of the cylinder 84 in the present preferred embodiment, the connecting portion 84c may be provided on an outer circumference of the cylinder 84.

Figure 11:
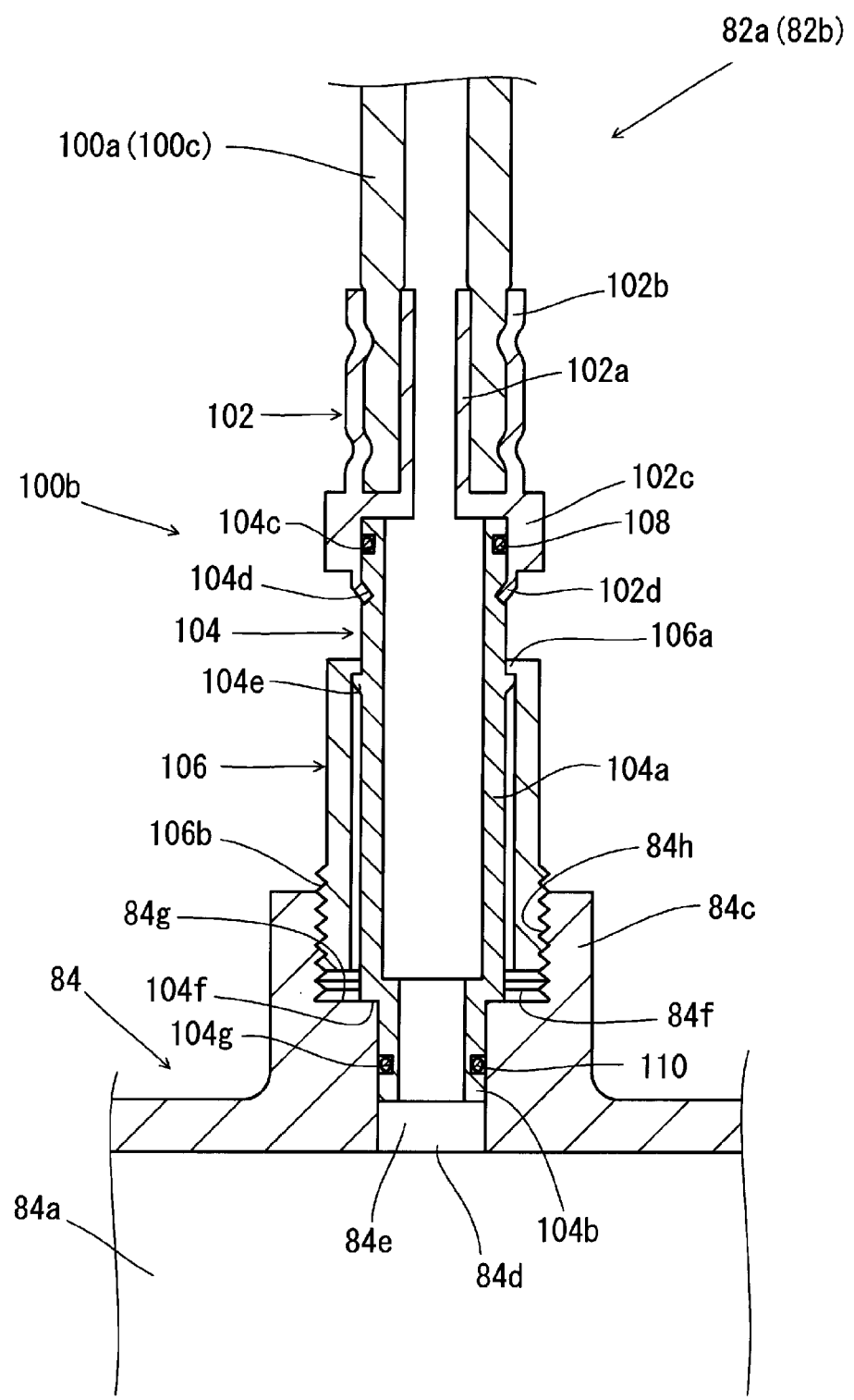
FIG. 11 is a sectional view, showing a connecting portion of a cylinder and an end portion of an oil path.

Referring to FIG. 11, the connecting portion 84c has a substantially cylindrical shape and includes a communication channel 84d. The communication channel 84d passes through the connecting portion 84c in an axial direction of the connecting portion 84c and communicates with the first oil chamber 84a. The communication channel 84d includes a small-diameter portion 84e which opens to the first oil chamber 84a; and a large-diameter portion 84f which has a larger diameter than the small-diameter portion 84e and opens to an outside of the cylinder 84. In an inner surface of the connecting portion 84c, an annular engaging surface 84g is located on a border region between the small-diameter portion 84e and the large-diameter portion 84f. In the inner surface of the connecting portion 84c, a thread groove 84h is formed in an area where the large-diameter portion 84f is provided.

Referring to FIG. 10, the piston 86 includes a communication channel 86a allowing the first oil chamber 84a and the second oil chamber 84b to communicate with each other. In the dampers 78a, 78b, the piston 86 is moved axially of the cylinder 84 when the piston rod 88 receives an external force. In this process, oil inside the cylinder 84 passes through the communication channel 86a, generating a damping force. It should be noted here that the dampers 78a, 78b may be conventional except for the connecting portion 84c, so no details will be given for those conventional configurations.

Figure 12:
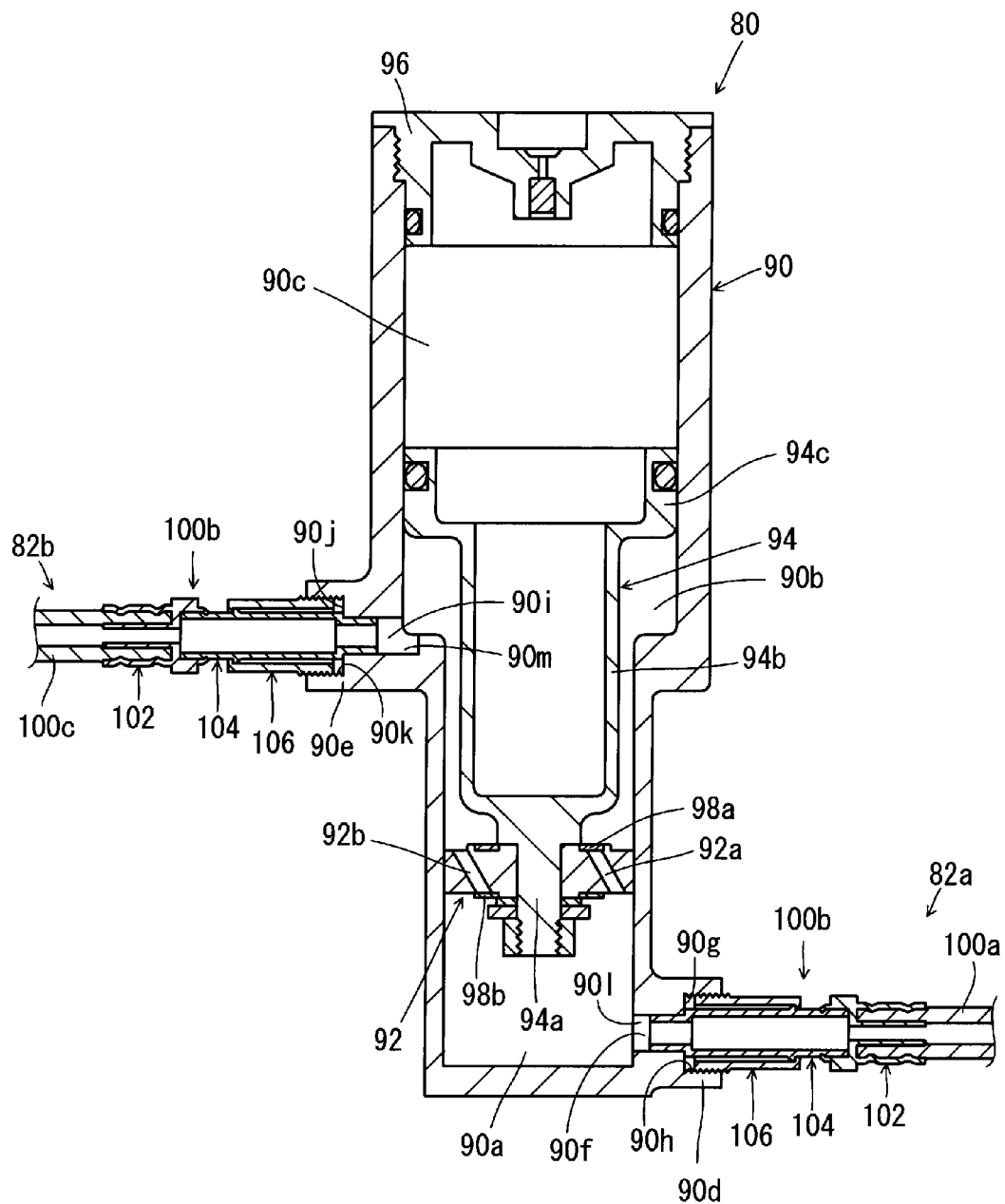
FIG. 12 is a sectional view, showing a pair of oil paths and an adjuster.

Referring to FIG. 12, the adjuster 80 includes a cylinder 90; a first piston 92; a second piston 94; and a cap 96 which closes an open end of the cylinder 90. The first piston 92 is slidable inside the cylinder 90. The second piston 94 includes a circular column portion 94a; a circular tube portion 94b which has a larger diameter than the circular column portion 94a; and a flange portion 94c provided at an end of the circular tube portion 94b. The first piston 92 is fixed to the circular column portion 94a of the second piston 94. The circular tube portion 94b has an outer circumferential surface, which does not make contact with the cylinder 90, so a gap is provided between the outer circumferential surface of the circular tube portion 94b and the inner circumferential surface of the cylinder 90. The flange portion 94c is slidable inside the cylinder 90.

In the adjuster 80, the first piston 92 and the second piston 94 divide an interior of the cylinder 90 into a first oil chamber 90a, a second oil chamber 90b and a gas chamber 90c. The first oil chamber 90a and the second oil chamber 90b are loaded with oil whereas the gas chamber 90c is loaded with gas (e.g., high pressure nitrogen gas).

The first piston 92 includes a first communication channel 92a and a second communication channel 92b which allow the first oil chamber 90a and the second oil chamber 90b to communicate with each other. A check valve 98a is attached on one side of the first piston 92 to close one of the openings of the first communication channel 92a whereas a check valve 98b is attached on the other side of the first piston 92 to close one of the openings of the second communication channel 92b.

The cylinder 90 includes a connecting portion 90d that connects the oil path 82a to the cylinder 90; and a connecting portion 90e that connects the oil path 82b to the cylinder 90. The connecting portions 90d, 90e preferably have the same configuration as the connecting portion 84c (see FIG. 11) of the cylinder 84 (see FIG. 10). Specifically, the connecting portion 90d includes a communication channel 90f which passes through the connecting portion 90d in an axial direction of the connecting portion 90d and communicates with the first oil chamber 90a. The connecting portion 90d includes an inner surface that includes an engaging surface 90g and a thread groove 90h which are essentially the same as the engaging surface 84g (see FIG. 11) and the thread groove 84h (see FIG. 11). Likewise, the connecting portion 90e includes a communication channel 90i which passes through the connecting portion 90e in an axial direction of the connecting portion 90e and communicates with the second oil chamber 90b. The connecting portion 90e includes an inner surface that includes an engaging surface 90j and a thread groove 90k which are essentially the same as the engaging surface 84g (see FIG. 11) and the thread groove 84h (see FIG. 11). It should be noted here that the adjuster 80 may be conventional except for the connecting portions 90d, 90e.

Referring to FIG. 10, the oil path 82a includes a hydraulic tube 100a and a pair of fitting members 100b attached to two end portions of the hydraulic tube 100a. The oil path 82b includes a hydraulic tube 100c and a pair of fitting members 100b attached to two end portions of the hydraulic tube 100c. No valves for stopping oil flow are provided inside the hydraulic tubes 100a, 100c. The hydraulic tube 100a and the hydraulic tube 100c are identical with each other except for the length.

Referring to FIG. 11, the fitting members 100b includes a swage member 102, a communication member 104 and a fixing member 106. The swage member 102 includes coaxial tubular portions 102a, 102b; and a hollow flange portion 102c provided at end portions of the tubular portions 102a, 102b. The flange portion 102c includes a surface (the surface away from the tubular portions 102a, 102b) provided with an annular pawl portion 102d. The hydraulic tube 100a (or the hydraulic tube 100c) has its end portion inserted between the tubular portion 102a and the tubular portion 102b, and under this state, the tubular portion 102b is swaged such that the swage member 102 is fixed to the end portion of the hydraulic tube 100a (or the hydraulic tube 100c).

The communication member 104 includes a cylindrical main body portion 104a and a cylindrical insertion portion 104b. The insertion portion 104b has an outer diameter, which is smaller than an outer diameter of the main body portion 104a and is substantially the same as the diameter of the small-diameter portion 84e of the communication channel 84d and small-diameter portions 90l, 90m (see FIG. 12) in the communication channels 90f, 90i (see FIG. 12).

In an outer circumferential surface of the main body portion 104a, annular grooves 104c, 104d are provided at an end portion (the end portion closer to the swage member 102). An oil seal 108 is attached to the groove 104c. The main body portion 104a has its one end portion inserted into the flange portion 102c of the swage member 102 whereas the pawl portion 102d of the swage member 102 is fitted into the groove 104*d* of the main body portion 104*a*. Thus, the end portion of the main body portion 104*a* is fixed to the swage member 102.

In an outer circumferential surface of the main body portion 104*a*, an annular projection 104*e* is provided more closely, than the groove 104*d* is, to the other end (the end closer to the insertion portion 104*b*). The main body portion 104*a* includes another end that includes an annular engaging surface 104*f*. An annular groove 104*g* is provided on an outer circumferential surface of the insertion portion 104*b*. An oil seal 110 is attached to the groove 104*g*.

The fixing member 106 is hollow, and is fitted around the communication member 104. The fixing member 106 includes an end portion (the end portion closer to the swage member 102) provided with an inward extending annular flange portion 106*a*. The flange portion 106*a* has an inner diameter which is smaller than an outer diameter of the projection 104*e* in the communication member 104. The fixing member 106 is attached to the communication member 104 so that the flange portion 106*a* is on one side (the side closer to the swage member 102) of the projection 104*e*. The fixing member 106 includes another end portion that includes an outer circumferential surface provided with a thread groove 106*b*.

When the fitting member 100*b* is connected to the connecting portion 84*c*, first, the insertion portion 104*b* of the communication member 104 is inserted into the small-diameter portion 84*e* of the connecting portion 84*c*. Next, the fixing member 106 is threaded into the connecting portion 84*c* so that the engaging surface 104*f* of the communication member 104 is engaged by the engaging surface 84*g* of the connecting portion 84*c* and the projection 104*e* of the communication member 104 is engaged by the flange portion 106*a* of the fixing member 106. Thus, the communication member 104 is fixed by the engaging surface 84*g* and the flange portion 106*a*, and therefore the fitting member 100*b* is fixed to the connecting portion 84*c*. Referring to FIG. 12, essentially the same procedure is followed to connect the fitting member 100*b* of the oil path 82*a* to the connecting portion 90*d* of the adjuster 80 and to connect the fitting member 100*b* of the oil path 82*b* to the connecting portion 90*e* of the adjuster 80. Thus, the dampers 78*a*, 78*b* and the adjuster 80 are connected with each other by the oil paths 82*a*, 82*b*. It should be noted here that in order to avoid complication in the drawing, FIG. 12 does not show the grooves 104*c*, 104*g* of the communication member 104 or the oil seals 108, 110.

Referring to FIG. 7 through FIG. 9, in the vehicle 10, the damping unit 64 assembled as described above (i.e., the damping unit 64 in which the dampers 78*a*, 78*b* and the adjuster 80 are connected with each other by the oil paths 82*a*, 82*b*) is installed to stride over the first support frame portion 16.

The adjuster 80 is attached to one of the upper frame members 42 (on the left-side upper frame member 42 in the present preferred embodiment) via an unillustrated mounting member. Referring to FIG. 9, the dampers 78*a*, 78*b* extend outward in the width direction of the vehicle 10, in an obliquely downward direction, as viewed from the pair of upper frame members 42. Specifically, the damper 78*a* is pivotably supported by a left end portion of the support member 54 via the mounting member 85 (see FIG. 8) while being supported pivotably by a left end portion of the upper arm 66*a* via a mounting member 89. The damper 78*b* is pivotably supported by a right end portion of the support member 54 via a mounting member 85 (see FIG. 10) while being supported pivotably by a right end portion of the upper arm 66*b* via a mounting member 89. The oil paths 82*a*, 82*b* are routed to pass above the pair of upper frame members 42. It should be noted here that in the vehicle 10, the dampers 78*a*, 78*b* are pivotably supported by the pair of upper frame members 42 via the support member 54 which connects the upper frame members 42 with each other.

Referring to FIG. 10, in the damping unit 64, when the damper 78*a* and the damper 78*b* receive external forces from opposite directions (when the piston 86 in the damper 78*a* and the piston 86 in the damper 78*b* are moving in opposite directions to each other), a damping force develops in the adjuster 80. Specifically, when the piston 86 in the damper 78*a* moves upward and the piston 86 in the damper 78*b* moves downward for example, oil flows from the damper 78*a* toward the damper 78*b* via the oil path 82*a*, the adjuster 80 and the oil path 82*b*. In this process, with reference to FIG. 12, a portion of oil in the first oil chamber 90*a* flows into the second oil chamber 90*b* through the first communication channel 92*a* and the check valve 98*a*, in the adjuster 80. This creates a damping force in the adjuster 80. In this case, referring to FIG. 10, the damper 78*a* can generate a damping force as a sum of the damping force generated by the oil passing through the communication channel 86*a* and a damping force generated in the adjuster 80. Likewise, the damper 78*b* can generate a damping force as a sum of the damping force generated by the oil passing through the communication channel 86*a* and a damping force generated in the adjuster 80.

When the piston 86 in the damper 78*a* moves downward and the piston 86 in the damper 78*b* moves upward, oil flows from damper 78*b* toward the damper 78*a* via the oil path 82*b*, the adjuster 80 and the oil path 82*a*. In this process, with reference to FIG. 12, a portion of oil in the second oil chamber 90*b* flows into the first oil chamber 90*a* through the second communication channel 92*b* and the check valve 98*b*, in the adjuster 80. This creates a damping force in the adjuster 80. In this case, referring to FIG. 10, the dampers 78*a*, 78*b* can generate a damping force as a sum of the damping force generated by the oil passing through the communication channels 86*a* and a damping force generated in the adjuster 80.

As understood, the damping unit 64 is capable of increasing the damping force generated by the dampers 78*a*, 78*b* via the adjuster 80 when the damper 78*a* and the damper 78*b* receive external forces acting in opposite directions.

On the other hand, when the damper 78*a* and the damper 78*b* receive external forces acting in the same direction (when the piston 86 in the damper 78*a* and the piston 86 in the damper 78*b* move in the same direction), there is no oil flow from the damper 78*a* toward the damper 78*b* (or from the damper 78*b* toward the damper 78*a*). In this case, the adjuster 80 does not generate any damping force, and thus damping forces generated in the dampers 78*a*, 78*b* are not increased. Referring to FIG. 12, when the dampers 78*a*, 78*b* (see FIG. 10) receive external forces acting in the same direction, causing oil to flow from the dampers 78*a*, 78*b* to the first oil chamber 90*a* and the second oil chamber 90*b* (or from the first oil chamber 90*a* and the second oil chamber 90*b* to the dampers 78*a*, 78*b*), the second piston 94 moves to adjust the volumes of the first oil chamber 90*a* and the second oil chamber 90*b*.

Figure 5:
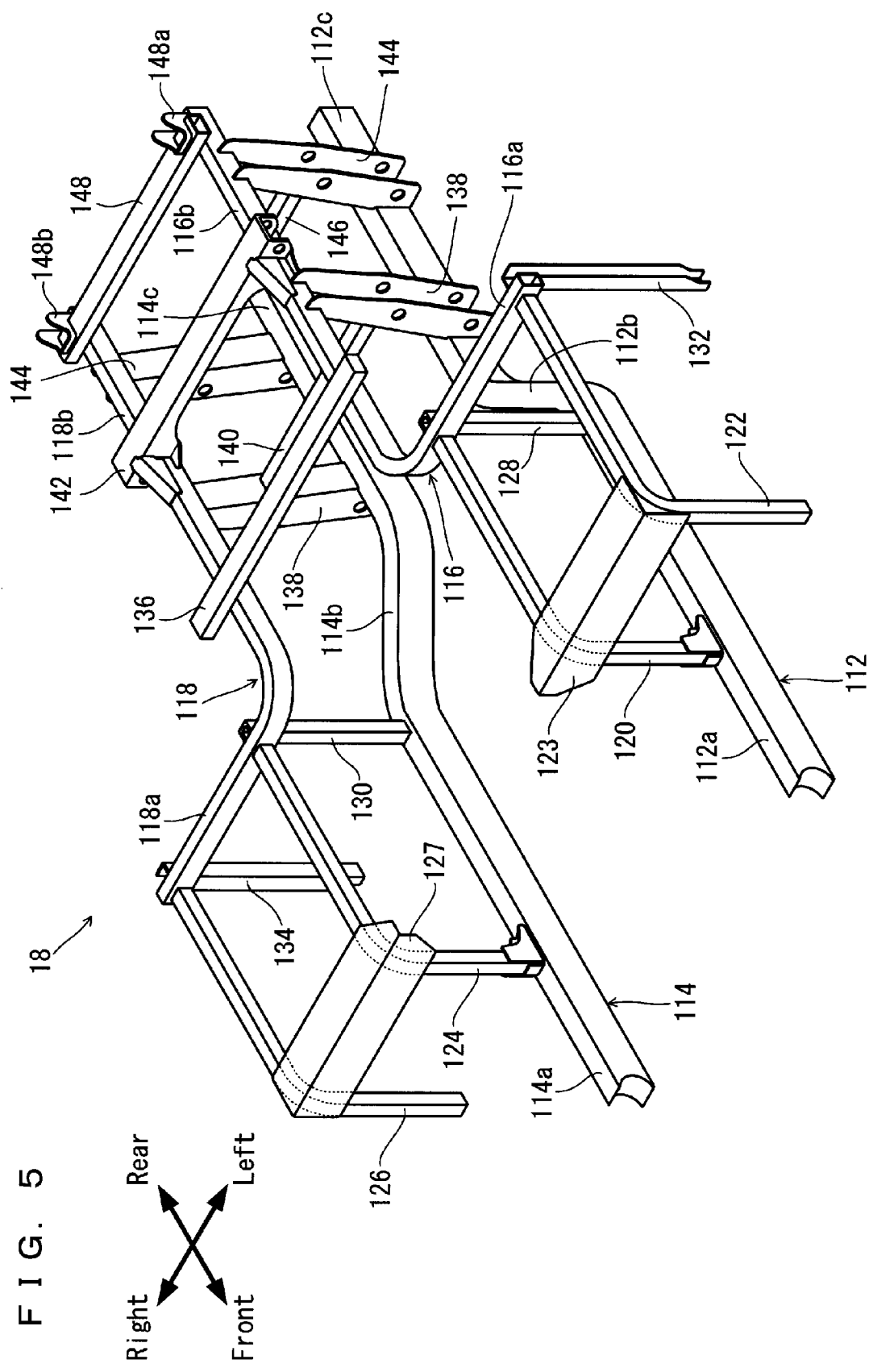
FIG. 5 is a perspective view, showing a second support frame portion.

Referring to FIG. 2 and FIG. 5, the second support frame portion 18 includes lower frame members 112, 114 which are a pair of rectangular pipes disposed on the left and right sides and extending rearward from the cross member 30 (see FIG. 2); and upper frame members 116, 118 which are a pair of rectangular pipes provided at a higher position than the lower frame members 112, 114.

Referring to FIG. 5, the lower frame member 112 includes a first portion 112a which extends rearward from the cross member 30 (see FIG. 2); a second portion 112b which extends from a rear end region of the first portion 112a in an obliquely rearward direction and inward in the width direction of the vehicle 10; and a third portion 112c which extends rearward from a rear end region of the second portion 112b. The lower frame member 114 is symmetrical with respect to the lower frame member 112, and includes a first portion 114a which extends rearward from the cross member 30 (see FIG. 2); a second portion 114b which extends from a rear end region of the first portion 114a in an obliquely rearward direction; and a third portion 114c which extends rearward from a rear end region of the second portion 114b.

The upper frame member 116 preferably has a shape of letter L in a plan view, and includes a first portion 116a which extends in the left-right direction; and a second portion 116b which extends rearward from a right end region of the first portion 116a. The upper frame member 118 is symmetrical with respect to the upper frame member 116, and includes a first portion 118a which extends in the left-right direction; and a second portion 118b which extends rearward from a left end region of the first portion 118a.

An L-shaped seat frame 120 extends forward from a right end region of the first portion 116a of the upper frame member 116 whereas an L-shaped seat frame 122 extends forward from a left end region of the first portion 116a. The seat frame 120 includes a tip end portion (lower end portion) supported by the first portion 112a of the lower frame member 112 whereas the seat frame 122 includes a tip end portion (lower end portion) supported by a reinforcing plate 152 (see FIG. 2, FIG. 6 and FIG. 7) to be described later. The seat frame 120 and the seat frame 122 have their corner portions connected with each other by a platy member 123 which has an L-shaped section.

An L-shaped seat frame 124 extends forward from a left end region of the first portion 118a of the upper frame member 118 whereas an L-shaped seat frame 126 extends forward from a right end region of the first portion 118a. The seat frame 124 includes a tip end portion (lower end portion) supported by the first portion 114a of the lower frame member 114 whereas the seat frame 126 includes a tip end portion (lower end portion) supported by a reinforcing plate 154 (see FIG. 2 and FIG. 7) to be described later. The seat frame 124 and the seat frame 126 have their corner portions connected with each other by a platy member 127 which has an L-shaped section.

A connecting member 128 provides connection between a rear end region of the first portion 112a of the lower frame member 112 and a right end region of the first portion 116a of the upper frame member 116. A connecting member 130 provides connection between a rear end region of the first portion 114a of the lower frame member 114 and a left end region of the first portion 118a of the upper frame member 118. The connecting member 128 has its upper end portion connected to a back surface of the first portion 116a whereas the connecting member 130 has its upper end portion connected to a back surface of the first portion 118a. In the present preferred embodiment, the seat frames 120, 122, 124, 126 and the connecting members 128, 130 are preferably provided by rectangular pipe members, for example.

A connecting member 132 extends downward from a left end region of the first portion 116a of the upper frame member 116 whereas a connecting member 134 extends downward from a right end region of the first portion 118a of the upper frame member 118. The connecting member 132 has its upper end portion connected to a back surface of the first portion 116a whereas the connecting member 132 has its lower end portion supported by the reinforcing plate 152 (see FIG. 2, FIG. 6 and FIG. 7) to be described later. Likewise, the connecting member 134 has its upper end portion connected to a back surface of the first portion 118a whereas the connecting member 134 has its lower end portion supported by the reinforcing plate 154 (see FIG. 2 and FIG. 7) to be described later.

A cross member 136 including a rectangular pipe provides connection between a front end region of the second portion 116b of the upper frame member 116 and a front end region of the second portion 118b of the upper frame member 118. At a more rearward position than the cross member 136, a pair of support members 138 each having a substantially U-shaped section connect the lower frame members 112, 114 with the upper frame members 116, 118. The support members 138 are connected with each other by a cross member 140 including a rectangular pipe.

At a more rearward position than the support members 138, the upper frame member 116 and the upper frame member 118 are connected with each other by a support member 142 which has a section that is preferably shaped substantially in an inverted letter of U. The support member 142 has its two end portions protruding more outward than the second portions 116b, 118b in the width direction of the vehicle 10.

At a more rearward position than the support member 142, a pair of support members 144 each preferably having a substantially U-shaped section connect the lower frame members 112, 114 with the upper frame members 116, 118. The support members 144 are connected with each other by a cross member 146 including a rectangular pipe. A cross member 148 including a rectangular pipe provides connection between a rear end region of the upper frame member 116 and a rear end region of the upper frame member 118. The cross member 148 has its two end portions provided with upward extending brackets 148a, 148b.

Referring to FIG. 2 and FIG. 7, a protection plate 150 connects the lower frame member 112 and the lower frame member 114 with each other, and extends from the cross member 30 to front end regions of the third portions 112c, 114c (see FIG. 7). The engine (not illustrated) is installed on the protection plate 150.

A protection plate 152 extends leftward from the first portion 112a (see FIG. 7) of the lower frame member 112 whereas a protection plate 154 extends rightward from the first portion 114a (see FIG. 7) of the lower frame member 114. The protection plate 152 has its front left end portion connected to a lower end portion of the side frame member 28. Likewise, the protection plate 154 has its front right end portion connected to a lower end portion of the side frame member 28.

Referring to FIG. 7, the second suspension system 22 has essentially the same configuration as the first suspension system 20 described earlier, and includes arm units 156a, 156b and a damping unit 64 described so far. The arm unit 156a includes an upper arm 158a; a lower arm 160a; and an upright (not illustrated) which connects the upper arm 158a and the lower arm 160a with each other and supports the rear wheel 26a rotatably. Likewise, the arm unit 156b includes an upper arm 158b; a lower arm 160b; and an upright (not illustrated) which connects the upper arm 158b and the lower arm 160b with each other and supports the rear wheel 26b rotatably.

The arm unit 156a is pivotably supported by the lower frame member 112 via the support member 138 and the support member 144. Specifically, the upper arm 158a has its front end portion supported by the support member 138 pivotably in the up-down direction. The upper arm 158a has its rear end portion supported by the support member 144 pivotably in the up-down direction. The lower arm 160a has its front end portion supported by the support member 138 pivotably in the up-down direction. The lower arm 160a has its rear end portion supported by the support member 144 pivotably in the up-down direction. Thus, the upper arm 158a and the lower arm 160a are pivotable in the up-down direction with respect to the second support frame portion 18.

Likewise, the arm unit 156b is pivotably supported by the lower frame member 114 via the support member 138 and the support member 144. Specifically, the upper arm 158b has its front end portion supported by the support member 138 pivotably in the up-down direction whereas the upper arm 158b has its rear end portion supported by the support member 144 pivotably in the up-down direction. The lower arm 160b has its front end portion supported by the support member 138 pivotably in the up-down direction whereas the lower arm 160b has its rear end portion supported by the support member 144 pivotably in the up-down direction. Thus, the upper arm 158b and the lower arm 160b are pivotable in the up-down direction with respect to the second support frame portion 18.

The arm units 156a, 156b include respective uprights, where rear wheel shafts 162a, 162b are inserted rotatably. The rear wheel shaft 162a includes an end portion connected with the rear wheel 26a. The rear wheel shaft 162a includes another end portion connected with a rear wheel differential (not illustrated). The rear wheel shaft 162b includes an end portion connected with the rear wheel 26b. The rear wheel shaft 162b includes another end portion connected with the rear wheel differential (not illustrated). The engine (not illustrated) generates power, which is transmitted to a rear wheel transmission shaft (not illustrated), the rear wheel differential (not illustrated), the rear wheel shafts 162a, 162b, and then to the rear wheels 26a, 26b. Thus, the rear wheels 26a, 26b are rotated.

Referring to FIG. 6 and FIG. 7, the second suspension system 22 is installed in essentially the same fashion as the first suspension system 20; i.e., a preassembled damping unit 64 (specifically, the damping unit 64 in which the dampers 78a, 78b and the adjuster 80 are connected with each other by the oil paths 82a, 82b) is installed to stride over the upper frame members 116, 118.

The adjuster 80 is attached to the upper frame member 116 via an unillustrated mounting member. The dampers 78a, 78b extend outward in the width direction of the vehicle 10, in an obliquely downward direction, as viewed from the pair of upper frame members 116, 118. Specifically, the damper 78a is pivotably supported by a left end portion of the support member 142 via a mounting member 85 (see FIG. 10) while being supported pivotably by the lower arm 160a (see FIG. 7) via a mounting member 89 (see FIG. 10). The damper 78b is pivotably supported by a right end portion of the support member 142 via a mounting member 85 (see FIG. 10) while being supported pivotably by the lower arm 160b (see FIG. 7) via a mounting member 89 (see FIG. 10). The oil paths 82a, 82b are routed to pass above the pair of upper frame members 116, 118. It should be noted that in the vehicle 10, the dampers 78a, 78b are pivotably supported by the upper frame members 116, 118 via the support member 142 which connects the upper frame member 116 and the upper frame member 118 with each other.

It should be noted that in the vehicle 10, the first support frame portion 16 allows the dampers 78a, 78b, the adjuster 80 and the oil paths 82a, 82b to pass through whichever of spaces between the upper frame members 42 and the lower frame members 38; between the pair of upper frame members 42; and between the pair of lower frame members 38. Likewise, the second support frame portion 18 allows the dampers 78a, 78b, the adjuster 80 and the oil paths 82a, 82b to pass through whichever of spaces between the upper frame members 116, 118 and the lower frame members 112, 114; between the upper frame member 116 and the upper frame member 118; and between the lower frame member 112 and the lower frame member 114.

Referring to FIG. 2 and FIG. 6, an X-shaped reinforcing frame 163 extends upward from the upper frame member 116 and the upper frame member 118 (see FIG. 2). Referring to FIG. 2 and FIG. 9, the reinforcing frame 163 has its upper end portion connected to upper portions of the side frame members 28.

Referring to FIG. 1, a bumper 164 is provided at a front end portion of the first support frame portion 16. A front lid 166 as an external member is provided to cover the first support frame portion 16 and the first suspension system 20 (see FIG. 2) from above. The front lid 166 is detachably supported by the upper frame members 42 (see FIG. 2) of the first support frame portion 16 via unillustrated connecting members (brackets, bolts, nuts, etc.) for example. Referring to FIG. 13, under a state where the front lid 166 is attached, the oil path 82a of the damping unit 64 in the first suspension system 20 (see FIG. 2) is between the front lid 166 and the upper frame member 42 on one side (the left-side upper frame member 42 in the present preferred embodiment). Likewise, the oil path 82b (see FIG. 2) is between the front lid 166 (see FIG. 1) and the upper frame member 42 (see FIG. 2) on another side (the right-side upper frame member 42 in the present preferred embodiment).

Referring to FIG. 1, a front cover 168 is provided at a lower region of the cabin frame portion 14 to cover a front of the cabin 14a. At a lower region of the cabin frame portion 14, a pair of side covers 170 (FIG. 1 shows only one side cover 170 on the left side) are provided to cover both sides of the cabin 14a. At a rear of the side covers 170, a pair of rear side covers 172 (FIG. 1 shows only one side cover 172 on the left side) extend rearward from the cabin frame portion 14. A cargo bed 174 as an external member is provided to cover the second support frame portion 18 (see FIG. 2) and the second suspension system 22 (see FIG. 2) from above. The cargo bed 174 is pivotably supported by the second support frame portion 18 (see FIG. 2 and FIG. 5) via unillustrated connecting members (e.g., hinges) and brackets 148a, 148b (see FIG. 2 and FIG. 5). Thus, the cargo bed 174 is openable/closable with respect to the second support frame portion 18. Under a state where the cargo bed 174 is closed, the oil path 82a (see FIG. 2) of the damping unit 64 (see FIG. 2) in the second suspension system 22 (see FIG. 2) is between the cargo bed 174 and the upper frame member 116 (see FIG. 2) whereas the oil path 82b (see FIG. 2) is between the cargo bed 174 and the upper frame member 118 (see FIG. 2).

In front of the cargo bed 174, a seat 176 is provided on the seat frames 120, 122 (see FIG. 5) whereas a seat 178 is provided on the seat frames 124, 126 (see FIG. 5). Above the seats 176, 178, head rests 180, 182 are provided on the reinforcing frame 163. The steering wheel 184 is in front of the seat 176.

In the vehicle 10 which is configured as described above, the damping units 64 incorporated in the first suspension system 20 and the second suspension system 22 increase damping forces generated by the dampers 78a, 78b through the adjusters 80 when the damper 78a and the corresponding damper 78b receive external forces acting in opposite directions to each other. An example of the case where the damper 78a and the damper 78b receive external forces acting in opposite directions is when the vehicle 10 is under a rolling force working in a direction to roll over the vehicle 10. In such a case, the vehicle 10 is capable of increasing damping forces generated by the dampers 78a, 78b. Thus, the vehicle 10 is capable of absorbing the rolling force sufficiently, which makes driving of the vehicle 10 comfortable.

Also, the vehicle 10 includes a frame 12 instead of a monocoque body. In this case, unlike a case where damping units are installed on a monocoque body, it is possible to install preassembled damping units 64 to a frame 12 (more specifically, to the first support frame portion 16 and the second support frame portion 18). This simplifies manufacture of the vehicle 10, making it possible to provide a more economical vehicle 10.

Also, the dampers 78a, 78b and the adjuster 80 are connected with each other in advance, with the oil paths 82a, 82b. Therefore, there is no need to provide valves at connecting portions between the dampers 78a, 78b and the oil paths 82a, 82b; at connecting portions between the adjuster 80 and the oil paths 82a, 82b: nor at the oil paths 82a, 82b in order to prevent oil leakage. Specifically, in the vehicle 10, no valves capable of stopping an oil flow are provided at the connecting portions 84c in the dampers 78a, 78b; the connecting portions 90d, 90e in the adjuster 80; the hydraulic tube 100a or the fitting members 100b in the oil path 82a; or the hydraulic tube 100c or the fitting members 100b in the oil path 82b. This provides a more economical damping unit 64, which makes it possible to provide a more economical vehicle 10.

Also, at times of maintenance activities for example, the damping unit 64 can be removed from the first support frame portion 16 or the second support frame portion 18 without disconnecting the dampers 78a, 78b and the adjuster 80 from the oil paths 82a, 82b. The arrangement makes it easier to remove the damping unit 64, leading to easier maintenance of the vehicle 10.

In the first suspension system 20, the adjuster 80 and the oil paths 82a, 82b are routed to pass above the upper frame members 42 and then connect the dampers 78a, 78b with each other. In this case, the damping unit 64 is disposed to stride over the upper frame members 42. This makes it easier to attach/detach the damping unit 64 to/from the first support frame portion 16. In the second suspension system 22, the adjuster 80 and the oil paths 82a, 82b are routed to pass above the upper frame members 116, 118 and then connect the dampers 78a, 78b with each other. In this case, the damping unit 64 is disposed to stride over the upper frame members 116, 118. This makes it easier to attach/detach the damping unit 64 to/from the second support frame portion 18. This makes manufacture and maintenance of the vehicle 10 easier.

The front lid 166 is supported by the first support frame portion 16 in a detachable/attachable fashion. In this case, servicing the damping unit 64 in the first suspension system 20 becomes easier by removing the front lid 166.

The cargo bed 174 is openable/closable with respect to the second support frame portion 18. In this case, servicing the damping unit 64 in the second suspension system 22 becomes easier by opening the cargo bed 174.

The adjuster 80 and the oil paths 82a, 82b in the first suspension system 20 are routed to pass through a more forward region than the cabin frame portion 14, and then connect the dampers 78a, 78b with each other. In this case, the arrangement makes it possible to increase the space in the cabin 14a since the adjuster 80 and the oil paths 82a, 82b in the first suspension system 20 are not disposed inside the cabin frame portion 14. Likewise, the adjuster 80 and the oil paths 82a, 82b in the second suspension system 22 are routed to pass through a more rearward region than the cabin frame portion 14, and then connect the dampers 78a, 78b with each other. In this case, the arrangement makes it possible to increase the space in the cabin 14a since the adjuster 80 and the oil paths 82a, 82b in the second suspension system 22 are not disposed inside the cabin frame portion 14.

The pair of upper frame members 42 and the pair of lower frame members 38 are provided by pipe members. This makes it possible to reduce the weight of the first support frame portion 16. Likewise, the pair of upper frame members 116, 118 and the pair of lower frame members 112, 114 are provided by pipe members. This makes it possible to reduce the weight of the second support frame portion 18.

In the preferred embodiment described above, the adjuster 80 of the damping unit 64 in the first suspension system 20 is disposed on an inner side of the upper frame members 42 in the width direction of the vehicle 10. However, the adjuster 80 may be disposed on an outer side (right side or left side) of the upper frame members 42 in the width direction of the vehicle 10. Likewise, the adjuster 80 of the damping unit 64 in the second suspension system 22 may be disposed on an outer side of the upper frame members 116, 118 in the width direction of the vehicle 10.

In the preferred embodiment described above, the adjuster 80 of the damping unit 64 in the first suspension system 20 preferably protrudes upward beyond the upper frame members 42. However, the adjuster 80 may be placed at a height between the upper frame members 42 and the lower frame members 38, or may protrude downward beyond the lower frame members 38. Likewise, the adjuster 80 of the damping unit 64 in the second suspension system 22 may be disposed at a height between the upper frame members 116, 118 and the lower frame members 112, 114, or may protrude downward beyond the lower frame members 112, 114.

In the preferred embodiment described above, the front lid 166 is preferably supported by the first support frame portion 16 in an attachable/detachable fashion. However, the front lid 166 may be supported pivotably by the first support frame portion 16 so that the front lid 166 is openable and closable with respect to the first support frame portion 16. In this case, the front lid 166 is pivotably supported by the pair of upper frame members 42 of the first support frame portion 16 via connecting members and brackets, like the cargo bed 174, for example.

In the preferred embodiment described above, the cargo bed 174 is pivotably supported by the second support frame portion 18. However, the cargo bed 174 may be detachably/attachably supported by the second support frame portion 18 like the front lid 166.

In the preferred embodiment described above, the adjuster 80 and the oil paths 82a, 82b in the first suspension system 20 are preferably routed above the upper frame members 42 to connect the dampers 78a, 78b with each other whereas the adjuster 80 and the oil paths 82a, 82b in the second suspension system 22 are routed above the upper frame members 116, 118 to connect the dampers 78a, 78b with each other. However, routing of the adjuster 80 and the oil paths 82a, 82b is not limited to the example given above.

Figure 14:
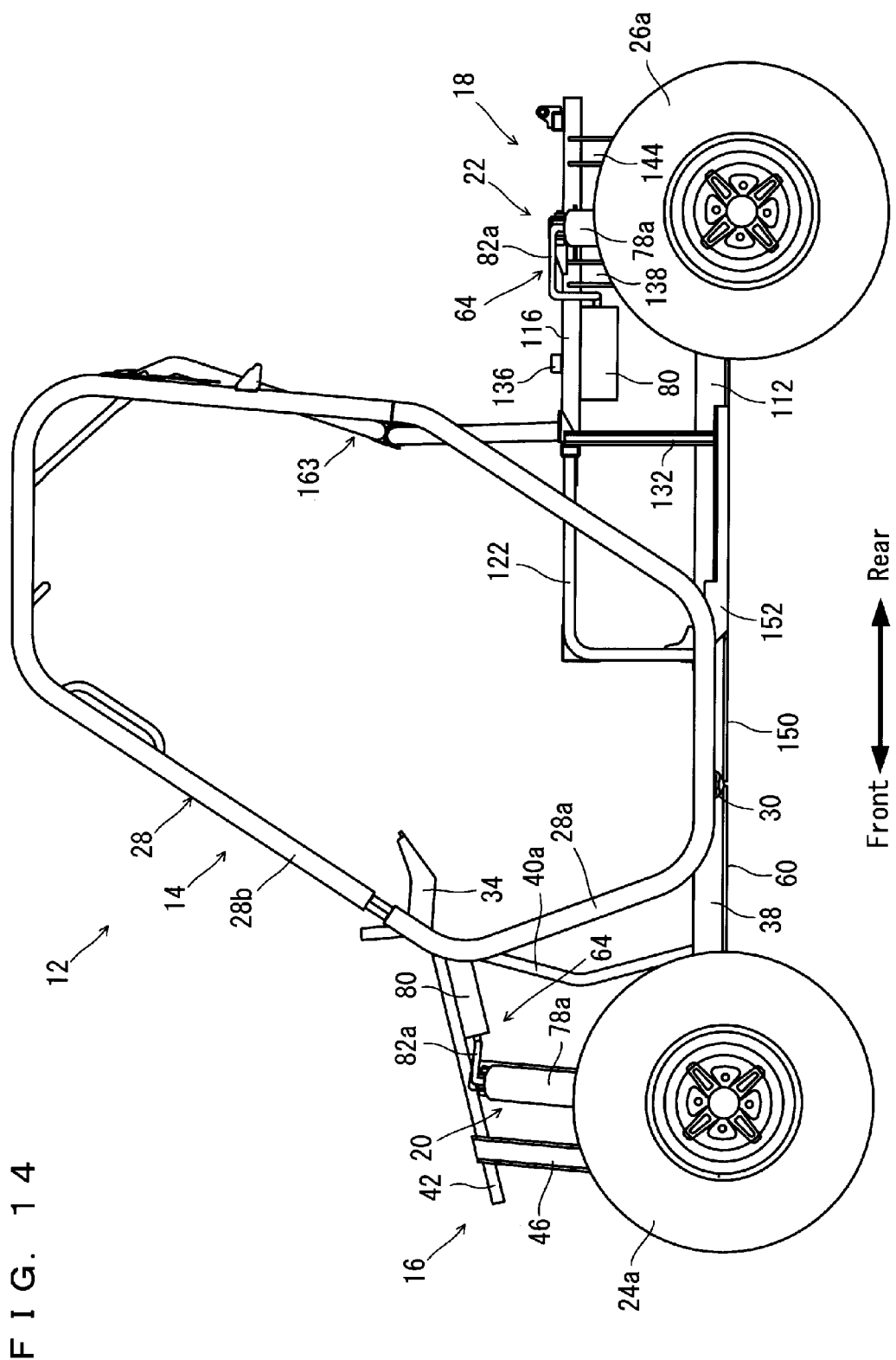
FIG. 14 is a side view, showing another example of how the damping unit may be disposed.
Figure 15:
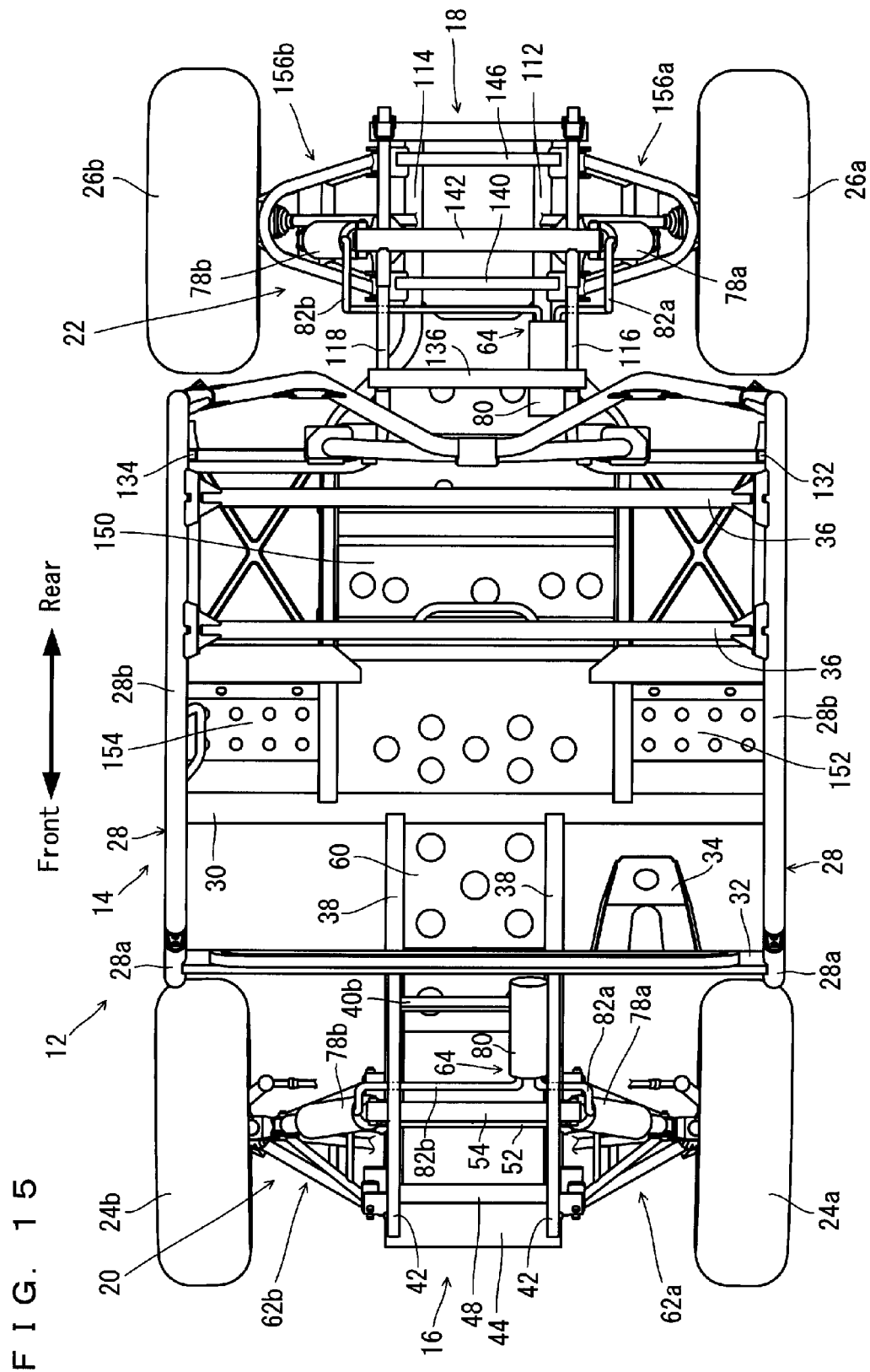
FIG. 15 is a plan view, showing another example of how the damping unit may be disposed.

For example, routing may be as shown in FIG. 14 and FIG. 15, where the adjuster 80 and the oil paths 82a, 82b in the first suspension system 20 are routed between the upper frame members 42 and the lower frame members 38 to connect the dampers 78a, 78b with each other whereas the adjuster 80 and the oil paths 82a, 82b in the second suspension system 22 are routed between the upper frame members 116, 118 and the lower frame members 112, 114 to connect the dampers 78a, 78b with each other.

It should be noted here that as has been described earlier, the first support frame portion 16 allows the dampers 78*a*, 78*b*, the adjuster 80 and the oil paths 82*a*, 82*b* to pass through a space between the upper frame members 42 and the lower frame members 38. Therefore, even in a case where the damping unit 64 is attached to the first support frame portion 16 as shown in FIG. 14 and FIG. 15, it is possible for a preassembled damping unit 64 to pass between the upper frame members 42 and the lower frame members 38. Therefore, it is not necessary to attach the dampers 78*a*, 78*b* and the adjuster 80 separately, to the first support frame portion 16. When the damping unit 64 is installed to the first support frame portion 16 as shown in FIG. 14 and FIG. 15, first, a preassembled damping unit 64 is disposed on the left side of the first support frame portion 16 for example. Next, the damper 78*b* which is to be disposed on the right side of the first support frame portion 16 is routed from the left side of the first support frame portion 16, through a space between the upper frame members 42 and the lower frame members 38, and then to the right side of the first support frame portion 16. Then, the adjuster 80 is routed from the left side of the first support frame portion 16, through a space between the left-side upper frame member 42 and the left-side lower frame member 38, and then to inside of the first support frame portion 16. In such a procedure, it is possible to install the damping unit 64 to the first support frame portion 16 from the left side of the first support frame portion 16. Although not elaborated herein, essentially the same procedure may be used to install the damping unit 64 to the first support frame portion 16 from the right side of the first support frame portion 16.

The first support frame portion 16 also allows the dampers 78*a*, 78*b*, the adjuster 80 and the oil paths 82*a*, 82*b* to pass through a space between the two upper frame members 42. Therefore, when the damping unit 64 is to be installed to the first support frame portion 16 as shown in FIG. 14 and FIG. 15, it is possible to install the damping unit 64 to the first support frame portion 16 from above the first support frame portion 16. Specifically, first, a preassembled damping unit 64 is disposed above the first support frame portion 16. Next, the damper 78*a*, which is to be disposed on the left side of the first support frame portion 16, is passed from above the first support frame portion 16, between the two upper frame members 42, then between the left-side upper frame member 42 and the left-side lower frame member 38, and then to the left side of the first support frame portion 16. Likewise, the damper 78*b*, which is to be disposed on the right side of the first support frame portion 16, is passed between the two upper frame members 42, then between the right-side upper frame member 42 and the right-side lower frame member 38, and then to the right side of the first support frame portion 16. Then, the adjuster 80 is passed between the upper frame members 42, to inside of the first support frame portion 16. In such a procedure, it is possible to install the damping unit 64 to the first support frame portion 16 from above the first support frame portion 16. Although not elaborated herein, it should be noted here that the dampers 78*a*, 78*b*, the adjuster 80 and the oil paths 82*a*, 82*b* can also pass through a space between the two lower frame members 38. Therefore, it is also possible to install the damping unit 64 to the first support frame portion 16 from below the first support frame portion 16.

As understood from the description given thus far, when the damping unit 64 is to be disposed as shown in FIG. 14 and FIG. 15, the damping unit 64 may be installed to the first support frame portion 16 from a side (from the right or the left side) of the first support frame portion 16; or may be installed to the first support frame portion 16 from above the first support frame portion 16; or may be installed to the first support frame portion 16 from below the first support frame portion 16. In this case, it is possible to select an appropriate installation procedure of the damping unit 64 in accordance with the structure of the vehicle, manufacturing environment of the vehicle, etc. Therefore, the arrangement makes it easier to install the damping unit 64 to the first support frame portion 16.

Likewise, the second support frame portion 18 allows the dampers 78*a*, 78*b*, the adjuster 80 and the oil paths 82*a*, 82*b* to pass through whichever of the spaces between the upper frame members 116, 118 and the lower frame members 112, 114; between the upper frame member 116 and the upper frame member 118; and between the lower frame member 112 and the lower frame member 114. Therefore, when the damping unit 64 is to be installed to the second support frame portion 18 as shown in FIG. 15, the installation may be made essentially in the same way as when installing the damping unit 64 to the first support frame portion 16; that is, a preassembled damping unit 64 may be installed to the second support frame portion 18 from a side of the second support frame portion 18, or may be installed to the second support frame portion 18 from above the second support frame portion 18, or may be installed to the second support frame portion 18 from below the second support frame portion 18.

As understood from the above, even when each damping unit 64 is to be disposed as shown in FIG. 14 and FIG. 15, it is possible to install preassembled damping units 64 to the first support frame portion 16 and to the second support frame portion 18. Thus, like in the vehicle 10 described with reference to FIG. 1 through FIG. 13, the arrangement makes it easier to manufacture the vehicle, and therefore provide a more economical vehicle. Also, like in the vehicle 10 described earlier, there is no need to provide valves at connecting portions between the dampers 78*a*, 78*b* and the oil paths 82*a*, 82*b*; at connecting portions between the adjuster 80 and the oil paths 82*a*, 82*b*; or in the oil paths 82*a*, 82*b* in order to prevent oil leakage. This provides a more economical damping unit 64, which makes it possible to provide a more economical vehicle. Also, since the adjuster 80 in the first suspension system 20 is disposed inside of the first support frame portion 16, the adjuster 80 is protected by the first support frame portion 16. Likewise, since the adjuster 80 in the second suspension system 22 is disposed inside the second support frame portion 18, the adjuster 80 is protected by the second support frame portion 18.

It should be noted here that in the example shown in FIG. 14 and FIG. 15, the adjuster 80 and the oil paths 82*a*, 82*b* of the first suspension system 20 are routed to pass through a region which is surrounded by the cabin frame portion 14 (the side frame members 28), the upper frame members 42, the lower frame members 38, the main members 40*a* and the support members 46 in a side view. However, the routing of the adjuster 80 and the oil paths 82*a*, 82*b* is not limited to the example described above. For example, the adjuster 80 and the oil paths 82*a*, 82*b* may be provided by passing them through a region which is between the upper frame members 42 and the lower frame members 38, and is located in a more forward position than the support members 46. Such an arrangement as the above is included in the idea that the adjuster 80 and the oil paths 82*a*, 82*b* are routed to pass through a space between the upper frame members 42 and the lower frame members 38. Likewise, there may be an arrangement that the adjuster 80 and the oil paths 82*a*, 82*b* of the second suspension system 22 pass through a region which is between the upper frame members 116, 118 and the lower frame members 112, 114, and is located in a more rearward position than the support members 144. Such an arrangement as described is included in the idea that the adjuster 80 and the oil paths 82*a*, 82*b* are routed to pass through a space between the upper frame members 116, 118 and the lower frame members 112, 114.

In the example shown in FIG. 14 and FIG. 15, the adjuster 80 in the first suspension system 20 is preferably disposed on an inner side of the upper frame members 42 in the width direction of the vehicle 10. However, the adjuster 80 may be disposed on an outer side (right side or left side) of the upper frame members 42 in the width direction of the vehicle 10. Likewise, the adjuster 80 in the second suspension system 22 may be disposed on an outer side of the upper frame members 116, 118 in the width direction of the vehicle 10.

Also, in the example shown in FIG. 14 and FIG. 15, the adjuster 80 in the first suspension system 20 preferably protrudes downward beyond the upper frame members 42. However, the adjuster 80 may protrude upward beyond the upper frame members 42, or may protrude downward beyond the lower frame members 38. Likewise, the adjuster 80 in the second suspension system 22 may protrude upward beyond the upper frame members 116, 118, or may protrude downward beyond the lower frame members 112, 114.

Figure 16:
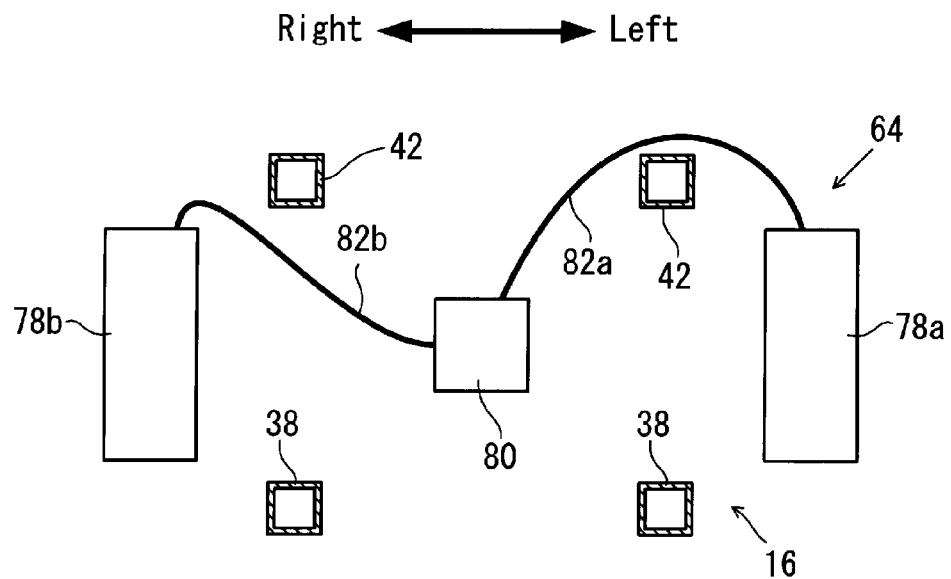
FIG. 16 shows how the damping unit may be disposed in a case where one oil path is routed to pass above a left-side upper frame member while another oil path is routed to pass between a right-side upper frame member and a right-side lower frame member.
Figure 17:
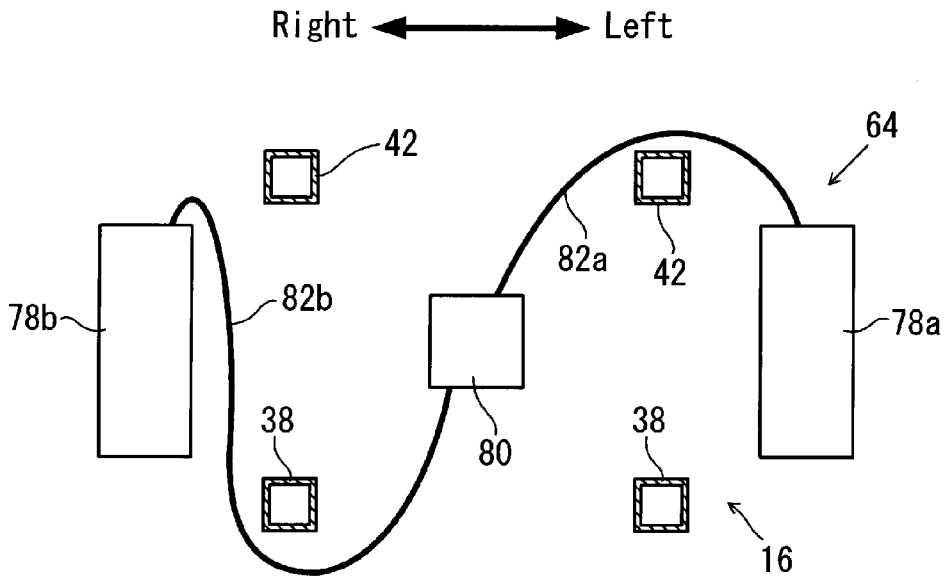
FIG. 17 shows how the damping unit may be disposed in a case where one oil path is routed to pass above the left-side upper frame member while another oil path is routed to pass below the right-side lower frame member.

In the preferred embodiments shown in FIG. 1 through FIG. 15, both damping units 64 preferably are disposed similarly so that both of the oil paths 82*a*, 82*b* in the first suspension system 20 are routed above (or below) the upper frame members 42 whereas both of the oil paths 82*a*, 82*b* in the second suspension system 22 are routed above (or below) the upper frame members 116, 118. However, the layout of the damping unit 64 is not limited to the examples described above. For example, as shown in FIG. 16, the damping unit 64 may be disposed so that the oil path 82*a* is routed above the left-side upper frame member 42 whereas the oil path 82*b* is routed between the right-side upper frame member 42 and the right-side lower frame member 38. Another example is shown in FIG. 17, where the damping unit 64 is disposed so that the oil path 82*a* is routed above the left-side upper frame member 42 whereas the oil path 82*b* is routed below the right-side lower frame member 38.

Figure 18:
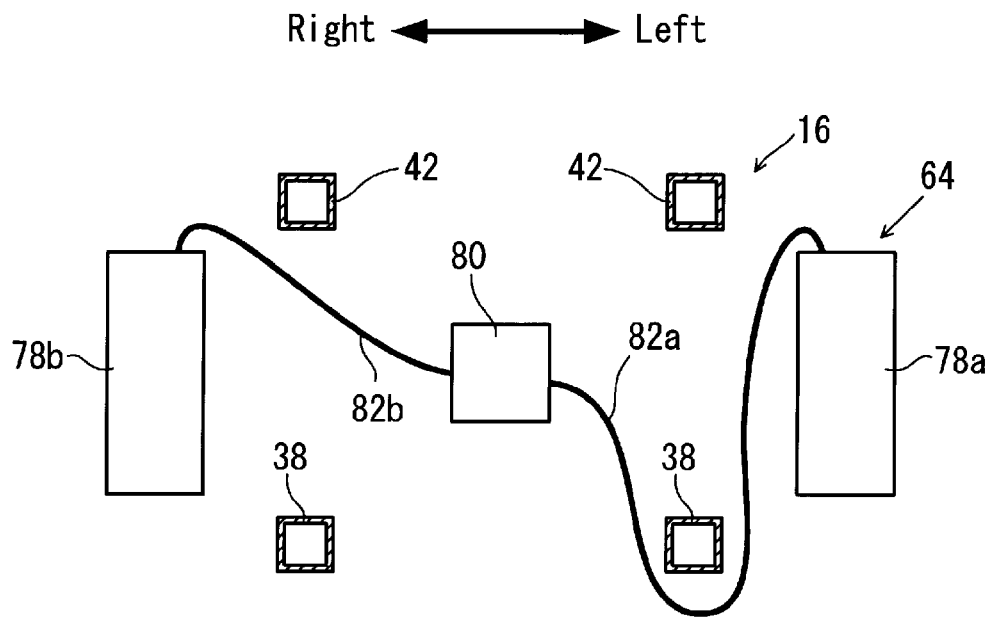
FIG. 18 shows how the damping unit may be disposed in a case where one oil path is routed to pass below a left-side lower frame member while another oil path is routed to pass between the right-side upper frame member and the right-side lower frame member.
Figure 19:
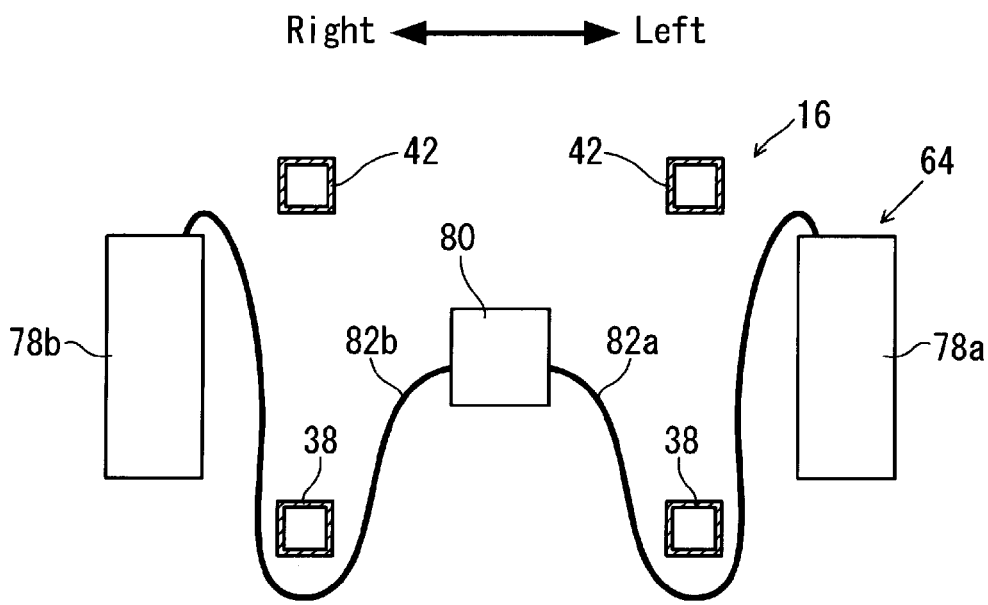
FIG. 19 shows how the damping unit may be disposed in a case where one oil path is routed to pass below the left-side lower frame member while another oil path is routed to pass below the right-side lower frame member.

Still another example is shown in FIG. 18, where the damping unit 64 is disposed so that the oil path 82*a* is routed below the left-side lower frame member 38 whereas the oil path 82*b* is routed between the right-side upper frame member 42 and the right-side lower frame member 38. Still another example is shown in FIG. 19, where the damping unit 64 is disposed so that the oil path 82*a* is routed below the left-side lower frame member 38 whereas the oil path 82*b* is routed below the right-side lower frame member 38.

In the examples shown in FIG. 16 through FIG. 19, the adjuster 80 is preferably located between the upper frame members 42 and the lower frame members 38. However, the adjuster 80 may be placed at a higher position than the upper frame members 42, or at a lower position than the lower frame members 38.

Also, in the examples shown in FIG. 16 through FIG. 19, the adjuster 80 is preferably located between the pair of upper frame members 42 (pair of lower frame members 38) in the vehicle width direction. However, as shown in FIG. 20 and FIG. 21, the adjuster 80 may be placed on an outer side of the pair of upper frame members 42 (pair of lower frame members 38) in the vehicle width direction, for example.

Figure 20:
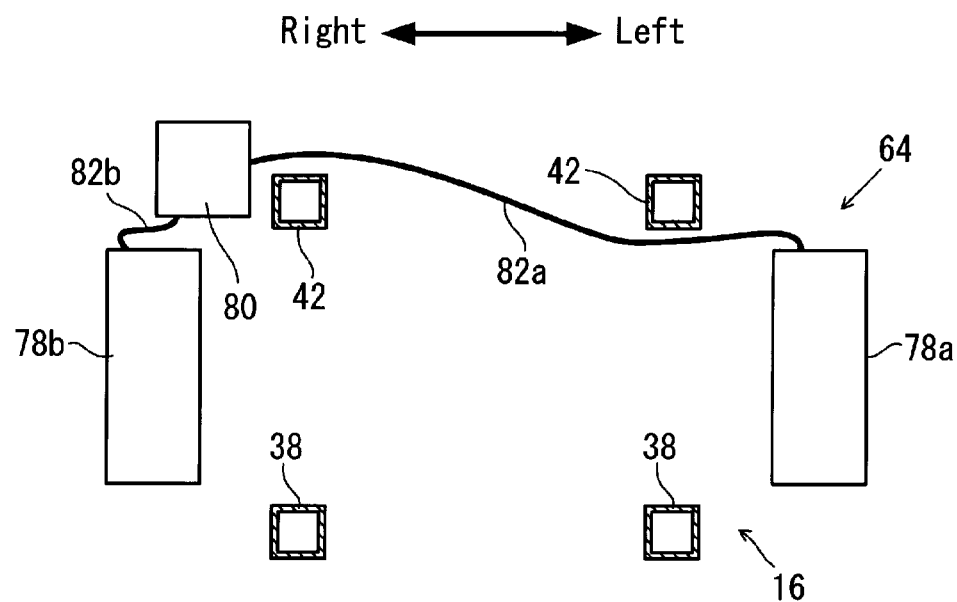
FIG. 20 shows how the damping unit may be disposed in a case where the adjuster is provided on an outer side of a pair of upper frame members and a pair of lower frame members, in a vehicle width direction.
Figure 21:
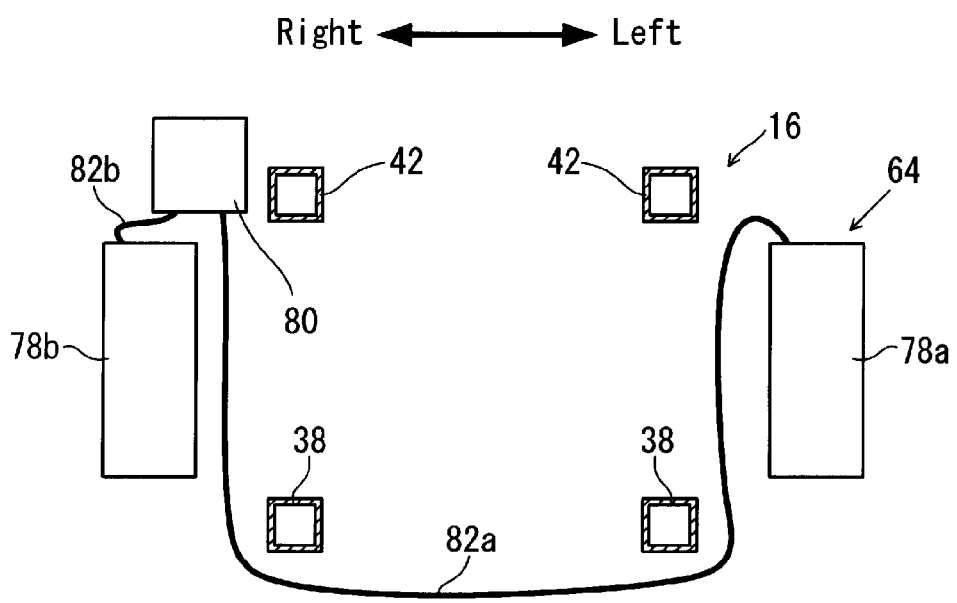
FIG. 21 shows another example of how the damping unit may be disposed in a case where the adjuster is provided on an outer side of the pair of upper frame members and the pair of lower frame members in the vehicle width direction.

It should be noted here that the damping unit 64 may be disposed so that the dampers 78*a*, 78*b* and the adjuster 80 are disposed as shown in FIG. 20 while the oil path 82*a* is routed to pass above the left-side upper frame member 42, and between the right-side upper frame member 42 and the right-side lower frame member 38. Also, the damping unit 64 may be disposed so that the dampers 78*a*, 78*b* and the adjuster 80 are disposed as shown in FIG. 21 while the oil path 82*a* is routed to pass below the left-side lower frame member 38, and between the right-side upper frame member 42 and the right-side lower frame member 38. Also, the damping unit 64 may be disposed so that the dampers 78*a*, 78*b* and the adjuster 80 are disposed as shown in FIG. 21, while the oil path 82*a* is routed to pass between the left-side upper frame member 42 and the left-side lower frame member 38, and below the right-side lower frame member 38.

Referring back to the examples described with reference to FIG. 20 and FIG. 21, the adjuster 80 may be placed at a higher position than the upper frame members 42; or at a height between the upper frame members 42 and the lower frame members 38; or at a lower position than the lower frame members 38.

Also, though not elaborated herein, the damping unit 64 may be disposed in a mirror symmetrical pattern of any of the layout patterns described with reference to FIG. 16 through FIG. 21.

As has been described earlier, the first support frame portion 16 allows the dampers 78*a*, 78*b*, the adjuster 80 and the oil paths 82*a*, 82*b* to pass through whichever of the spaces between the upper frame members 42 and the lower frame members 38; between the pair of upper frame members 42; and between the pair of lower frame members 38. The arrangement makes it possible to increase the number of variations in an installation procedure of the damping unit 64. For example, when the damping unit 64 is to be disposed as shown in FIG. 15, it is possible as has been described earlier, to install the damping unit 64 to the first support frame portion 16 from a side of the first support frame portion 16, or to install to the first support frame portion 16 from above the first support frame portion 16.

In addition, it is also possible to dispose the damping unit 64 as shown in FIG. 16, by following the procedure given below, for example: First, a preassembled damping unit 64 is disposed on the right side of the first support frame portion 16. Next, the damper 78*a* is passed between the right-side upper frame member 42 and the right-side lower frame member 38; then between the two upper frame members 42; then above the left-side upper frame member 42; and then to the left side of the first support frame portion 16. Next, the adjuster 80 is passed between the right-side upper frame member 42 and the right-side lower frame member 38, to inside of the first support frame portion 16. In this way, the damping unit 64 can be installed as shown in FIG. 16.

The layout shown in FIG. 16 is also possible by following the procedure described below, for example. First, the damping unit 64 is disposed above the first support frame portion 16. Then, the damper 78*b* is passed between the two upper frame members 42; then between the right-side upper frame member 42 and the right-side lower frame member 38; and then to the right side of the first support frame portion 16. The damper 78*a* is passed above the left-side upper frame member 42, and then to the left side of the first support frame portion 16. The adjuster 80 is passed between the two upper frame members 42, and then to the inside of the first support frame portion 16. In this way, the damping unit 64 can be installed as shown in FIG. 16.

Likewise, a variety of installation procedures are possible to dispose the damping unit 64 as shown in FIG. 17 through FIG. 21. Like in the first suspension system 20, a variety of installation procedures are available for installation of the damping unit 64 in the second suspension system 22 to the second support frame portion 18.

As has been described, in the vehicle according to various preferred embodiments of the present invention, a variety of layout and a variety of installation procedures are available for installation of the damping units 64 to the first support frame portion 16 and to the second support frame portion 18. Therefore, it is possible to change the layout or installation procedure of the damping unit 64 appropriately in accordance with the structure of the vehicle, manufacturing environment of the vehicle, etc. By doing so, it becomes possible to increase efficiency of installation operation when the damping units 64 are installed to the first support frame portion 16 and the second support frame portion 18.

In the preferred embodiments described above, the connecting portion 84c, the connecting portions 90d, 90e and the oil paths 82a, 82b are taken as examples for describing the connecting portion of the damper, the connecting portions of the adjuster, and the oil paths. However, the connecting portion of the damper, the connecting portions of the adjuster, and the oil paths are not limited to those preferred embodiments described thus far. Many connecting portions and oil paths which do not have valves may be usable in the present invention.

In the preferred embodiments described above, description was made of an example application to a vehicle 10 which includes a double wishbone type suspension in the first suspension system 20 and the second suspension system 22. However, the first suspension system and the second suspension system are not limited to the examples described thus far. The present invention is also applicable to vehicles which include other types of independent suspension systems (e.g., strut suspension), or vehicles which include axle suspension systems.

In the preferred embodiments described so far, description was made of arm units 62a, 62b, 156a, 156b each including two arms. However, the number of the arms in the arm unit is not limited to those in the examples described thus far. For example, the arm unit may have only one arm, or three or more arms.

In a preferred embodiment described above, the damping unit 64 included in the first suspension system 20 and the damping unit 64 included in the second suspension system 22 preferably are of the same configuration. However, damping units in the first suspension system and in the second suspension system may be of different configurations. Specifically, for example, the dampers in the first suspension system may be of a certain make (construction, specifications, sizes, etc.) whereas the dampers in the second suspension system may be of a certain different make (construction, specifications, sizes, etc.); the adjuster in the first suspension system may be of a certain make (construction, specifications, sizes, etc.) whereas the adjuster in the second suspension system may be of a certain different make (construction, specifications, sizes, etc.); or the oil paths in the first suspension system may be of a certain make (construction, specifications, sizes, etc.) whereas the oil paths in the second suspension system may be of a certain different make (construction, specifications, sizes, etc.).

In the preferred embodiments described above, description was made of a vehicle which includes a pair of front wheels 24a, 24b and a pair of rear wheels 26a, 26b. However, the present invention is applicable to vehicles which include two or more pairs of front wheels, and vehicles which include two or more pairs of rear wheels as well. Vehicles which include two or more pairs of front wheels may have the first suspension system for each pair of the front wheels. Vehicles which include two or more pairs of rear wheels may have the second suspension system for each pair of the rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   at least a pair of wheels;
   a suspension system suspending the at least a pair of wheels;
   a cabin frame portion; and
   a support frame portion extending to a more forward or rearward position than the cabin frame portion and supporting the suspension system; wherein
   the suspension system includes a damping unit, the damping unit includes a pair of dampers provided at a distance from each other in a vehicle width direction corresponding to the at least a pair of wheels for generation of damping forces via oil viscosity resistance, an adjuster that adjusts the damping forces generated by the pair of dampers, and a pair of oil paths connecting the pair of dampers to the adjuster and allowing oil to flow therethrough;
   the support frame portion includes a pair of upper frame members provided at a distance from each other in the vehicle width direction and extending in a fore-aft direction and a pair of lower frame members provided at a lower height than the pair of upper frame members at a distance from each other in the vehicle width direction and extending in the fore-aft direction, and a space is provided between the pair of upper frame members and the pair of lower frame members that is passable by the pair of dampers;
   each of the pair of dampers includes a mounting member pivotally supported about a pivot axis by the pair of upper frame members, and a first connecting portion connected with a respective one of the pair of oil paths, the mounting member and the first connecting portion provided adjacent to each other on an upper end portion of each of the pair of dampers with the first connecting portion disposed on a more outer side than the pivot axis in the vehicle width direction;
   the adjuster includes a pair of second connecting portions connected with the pair of oil paths, and the adjuster is disposed on an inner side of the pair of upper frame members;
   none of the first connecting portions, the second connecting portions, and the pair of oil paths are provided with valves capable of stopping oil flow; and
   at least a portion of one of the pair of dampers on one side in the vehicle width direction is disposed on a more outer side than one of the pair of upper frame members on the one side in the vehicle width direction.

2. The vehicle according to claim 1, wherein the suspension system includes a pair of arm units pivotably supporting the at least a pair of wheels with respect to the support frame portion, and the pair of lower frame members pivotably support the pair of arm units.

3. The vehicle according to claim 1, wherein the pair of upper frame members and the pair of lower frame members include pipe members.

4. The vehicle according to claim 1, wherein the pair of oil paths and the adjuster are routed to pass above the pair of upper frame members to connect the pair of dampers with each other.

5. The vehicle according to claim 4, wherein the at least a pair of wheels includes a pair of front wheels, the support frame portion extends to a more forward position than the cabin frame portion, and the pair of oil paths and the adjuster are routed to pass through a more forward region than the cabin frame portion to connect the pair of dampers with each other.

6. The vehicle according to claim 4, wherein the at least a pair of wheels includes a pair of rear wheels, the support frame portion extends to a more rearward position than the cabin frame portion, and the pair of oil paths and the adjuster are routed to pass through a more rearward region than the cabin frame portion to connect the pair of dampers with each other.

7. The vehicle according to claim 1, wherein one of the pair of oil paths is routed to pass above the one of the pair of upper frame members on the one side and is connected with the one of the pair of dampers on the one side.

8. The vehicle according to claim 7, further comprising an external member covering the support frame portion, wherein the one of the pair of oil paths is routed to pass between the one of the pair of upper frame members on the one side and the external member.

9. The vehicle according to claim 8, wherein the external member is openable and closable with respect to the support frame portion.

10. The vehicle according to claim 8, wherein the external member is supported by the support frame portion detachably therefrom and attachably thereto.

\* \* \* \* \*